US012355971B2

(12) United States Patent
Choi et al.

(10) Patent No.: US 12,355,971 B2
(45) Date of Patent: *Jul. 8, 2025

(54) METHOD FOR DECODING VIDEO FOR RESIDUAL CODING AND DEVICE THEREFOR

(71) Applicant: LG Electronics Inc., Seoul (KR)

(72) Inventors: Jungah Choi, Seoul (KR); Jin Heo, Seoul (KR); Sunmi Yoo, Seoul (KR); Jaehyun Lim, Seoul (KR); Jangwon Choi, Seoul (KR); Seunghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/644,461

(22) Filed: Apr. 24, 2024

(65) Prior Publication Data

US 2024/0275976 A1 Aug. 15, 2024

Related U.S. Application Data

(63) Continuation of application No. 17/629,958, filed as application No. PCT/KR2020/011418 on Aug. 26, 2020, now Pat. No. 12,010,315.

(Continued)

(51) Int. Cl.
*H04N 19/132* (2014.01)
*H04N 19/12* (2014.01)
(Continued)

(52) U.S. Cl.
CPC ........... *H04N 19/132* (2014.11); *H04N 19/12* (2014.11); *H04N 19/159* (2014.11); *H04N 19/176* (2014.11); *H04N 19/70* (2014.11)

(58) Field of Classification Search
CPC .... H04N 19/132; H04N 19/12; H04N 19/159; H04N 19/176; H04N 19/70; H04N 19/13;
(Continued)

(56) References Cited

U.S. PATENT DOCUMENTS

| 2012/0170647 A1 | 7/2012 | He et al. | |
| 2014/0016698 A1* | 1/2014 | Joshi | H04N 19/14 |
| | | | 375/240.12 |

(Continued)

FOREIGN PATENT DOCUMENTS

| JP | 2016-514911 A | 5/2016 |
| JP | 2022-523789 A | 4/2022 |
| WO | 2014/162749 A1 | 10/2014 |

OTHER PUBLICATIONS

Office Action in Japanese Appin. No. 2024-035231, mailed on Feb. 25, 2025, 4 pages.

(Continued)

*Primary Examiner* — Tung T Vo
(74) *Attorney, Agent, or Firm* — Fish & Richardson P.C.

(57) ABSTRACT

A method for decoding a video performed by a decoding device according to the present document is characterized by comprising: a step for acquiring video information including prediction mode information and residual information through a bitstream; a step for deriving a prediction mode of a current block on the basis of the prediction mode information; a step for deriving a prediction sample on the basis of the prediction mode; a step for deriving a current residual coefficient on the basis of residual syntax elements for the current residual coefficient in the current block; a step for deriving a residual sample on the basis of the current residual coefficient; and a step for deriving a reconstructed sample of the current block on the basis of the prediction sample and the residual sample.

14 Claims, 16 Drawing Sheets

Related U.S. Application Data

(60) Provisional application No. 62/894,749, filed on Aug. 31, 2019.

(51) Int. Cl.
*H04N 19/159* (2014.01)
*H04N 19/176* (2014.01)
*H04N 19/70* (2014.01)

(58) Field of Classification Search
CPC .... H04N 19/157; H04N 19/18; H04N 19/182; H04N 19/91
USPC ..................................... 375/240.02
See application file for complete search history.

(56) References Cited

U.S. PATENT DOCUMENTS

| | | | |
|---|---|---|---|
| 2014/0210652 A1* | 7/2014 | Bartnik | H03M 7/40 341/67 |
| 2016/0353110 A1* | 12/2016 | Zhang | H04N 19/126 |
| 2016/0353113 A1* | 12/2016 | Zhang | H04N 19/159 |
| 2020/0036990 A1* | 1/2020 | Andersson | H04N 19/40 |
| 2020/0045316 A1* | 2/2020 | Leleannec | H04N 19/157 |
| 2020/0068206 A1* | 2/2020 | Hsiang | H04N 19/70 |
| 2020/0296420 A1 | 9/2020 | Karczewicz et al. | |

OTHER PUBLICATIONS

Office Action in Chinese Appln. No. 202080061204.X, mailed on Feb. 21, 2025, 8 pages.

\* cited by examiner

METHOD FOR DECODING VIDEO FOR RESIDUAL CODING AND DEVICE THEREFOR

CROSS-REFERENCE TO RELATED APPLICATIONS

This application is a continuation of U.S. application Ser. No. 17/629,958, filed on Jan. 25, 2022, which is a National Stage application under 35 U.S.C. § 371 of International Application No. PCT/KR2020/011418, filed on Aug. 26, 2020, which claims the benefit of U.S. Provisional Application No. 62/894,749, filed on Aug. 31, 2019. The disclosures of the prior applications are incorporated by reference in their entirety.

BACKGROUND OF DISCLOSURE

Field of the Disclosure

The present disclosure relates to image coding technology, and more particularly, to an image decoding method of coding simplified residual data without performing level mapping in an image coding system, and an apparatus therefor.

Related Art

Recently, demand for high-resolution, high-quality images, such as High Definition (HD) images and Ultra High Definition (UHD) images, has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high-resolution and high-quality images.

SUMMARY

The present disclosure provides a method and apparatus for improving image coding efficiency.

The present disclosure also provides a method and apparatus for improving residual coding efficiency.

According to an embodiment of this document, an image decoding method performed by a decoding apparatus is provided. The method includes obtaining image information including residual information and prediction mode information through a bitstream, deriving a prediction mode of a current block based on the prediction mode information, deriving a prediction sample based on the prediction mode, deriving a current residual coefficient based on residual syntax elements for the current residual coefficient in the current block, deriving a residual sample based on the current residual coefficient, and deriving a reconstructed sample of the current block based on the residual sample and the prediction sample.

According to another embodiment of this document, a decoding apparatus for performing image decoding is provided. The decoding apparatus includes an entropy decoder which obtains image information including residual information and prediction mode information through a bitstream, a predictor which derives a prediction mode of a current block based on the prediction mode information, and derives a prediction sample based on the prediction mode, a residual processor which derives a current residual coefficient based on residual syntax elements for the current residual coefficient in the current block, and derives a residual sample based on the current residual coefficient, and an adder which derives a reconstructed sample of the current block based on the residual sample and the prediction sample.

According to still another embodiment of this document, a video encoding method which is performed by an encoding apparatus is provided. The method includes deriving a prediction sample of a current block based on inter prediction or intra prediction, deriving a residual sample of the current block based on the prediction sample, deriving a current residual coefficient based on the residual sample, and encoding image information including residual syntax elements for the current residual coefficient and prediction mode information indicating a prediction mode of the current block.

According to still another embodiment of this document, a video encoding apparatus is provided. The encoding apparatus includes a predictor which derives a prediction sample of a current block based on inter prediction or intra prediction, a residual processor which derives a residual sample of the current block based on the prediction sample, and derives a current residual coefficient based on the residual sample, and an entropy encoder which encodes image information including residual syntax elements for the current residual coefficient and prediction mode information indicating a prediction mode of the current block.

According to the present disclosure, it is possible to improve the efficiency of residual coding.

According to the present disclosure, it is possible to improve overall image/video compression efficiency and reduce the coding complexity by deriving the residual coefficients to which the simplified residual data coding is applied without performing level mapping.

DESCRIPTION OF EXEMPLARY EMBODIMENTS

Figure 1:
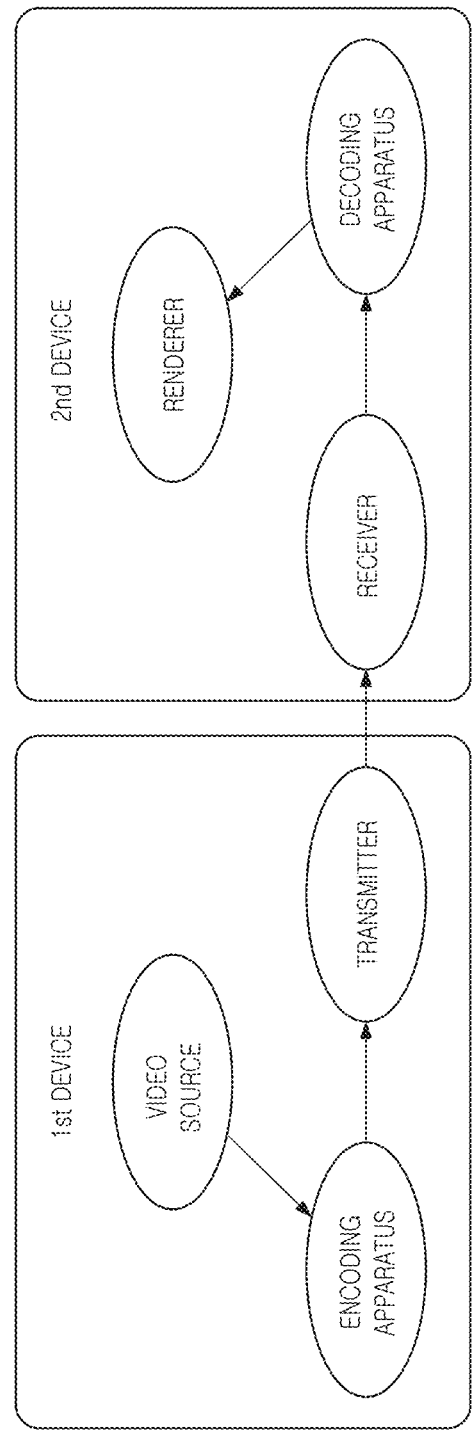
FIG. 1 briefly illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bit stream.

The transmitter may transmit the encoded image/image information or data output in the form of a bit stream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bit stream and transmit the received bit stream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (e.g., H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a subpicture/slice/tile is a unit constituting part of a picture in coding. The subpicture/slice/tile may include one or more coding tree units (CTUs). One picture may consist of one or more subpictures/slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. In addition, a subpicture may represent a rectangular region of one or more slices within a picture. That is, a subpicture contains one or more slices that collectively cover a rectangular region of a picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (e.g., cb, cr) blocks. The unit may be used interchangeably with terms such as block or area in some cases. In a general case, an M×N block may include samples (or sample arrays) or a set (or array) of transform coefficients of M columns and N rows.

In the present description, "A or B" may mean "only A", "only B" or "both A and B". In other words, in the present specification, "A or B" may be interpreted as "A and/or B". For example, "A, B or C" herein means "only A", "only B", "only C", or "any and any combination of A, B and C".

A slash (/) or a comma (comma) used in the present description may mean "and/or". For example, "A/B" may mean "A and/or B". Accordingly, "A/B" may mean "only A", "only B", or "both A and B". For example, "A, B, C" may mean "A, B, or C".

In the present description, "at least one of A and B" may mean "only A", "only B", or "both A and B". In addition, in the present description, the expression "at least one of A or B" or "at least one of A and/or B" may be interpreted the same as "at least one of A and B".

In addition, in the present description, "at least one of A, B and C" means "only A", "only B", "only C", or "any combination of A, B and C". Also, "at least one of A, B or C" or "at least one of A, B and/or C" may mean "at least one of A, B and C".

In addition, parentheses used in the present description may mean "for example". Specifically, when "prediction (intra prediction)" is indicated, "intra prediction" may be proposed as an example of "prediction". In other words, "prediction" in the present description is not limited to "intra prediction", and "intra prediction" may be proposed as an example of "prediction". Also, even when "prediction (i.e., intra prediction)" is indicated, "intra prediction" may be proposed as an example of "prediction".

In the present description, technical features that are individually described within one drawing may be implemented individually or may be implemented at the same time.

The following drawings were created to explain a specific example of the present description. Since the names of specific devices described in the drawings or the names of specific signals/messages/fields are presented by way of example, the technical features of the present description are not limited to the specific names used in the following drawings.

Figure 2:
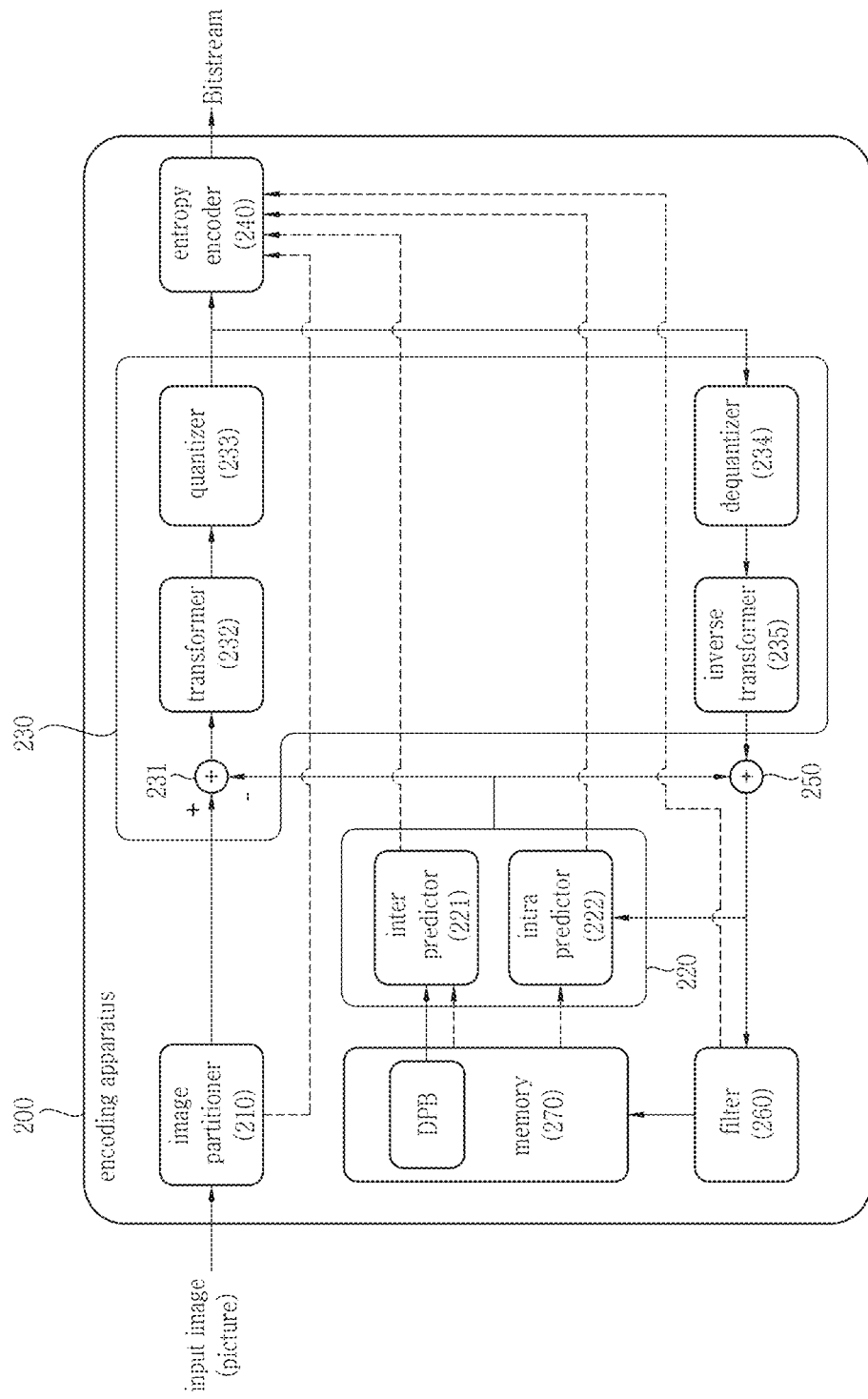
FIG. 2 is a schematic diagram illustrating a configuration of a video/image encoding apparatus to which the embodiment(s) of the present disclosure may be applied.

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (e.g., an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bit stream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a Karhunen-loeve transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bit stream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g., values of syntax elements, etc.) together or separately. Encoded information (e.g., encoded video/image information) may be transmitted or stored in units of NALs (network abstraction layer) in the form of a bit stream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bit stream. The bit stream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bit stream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
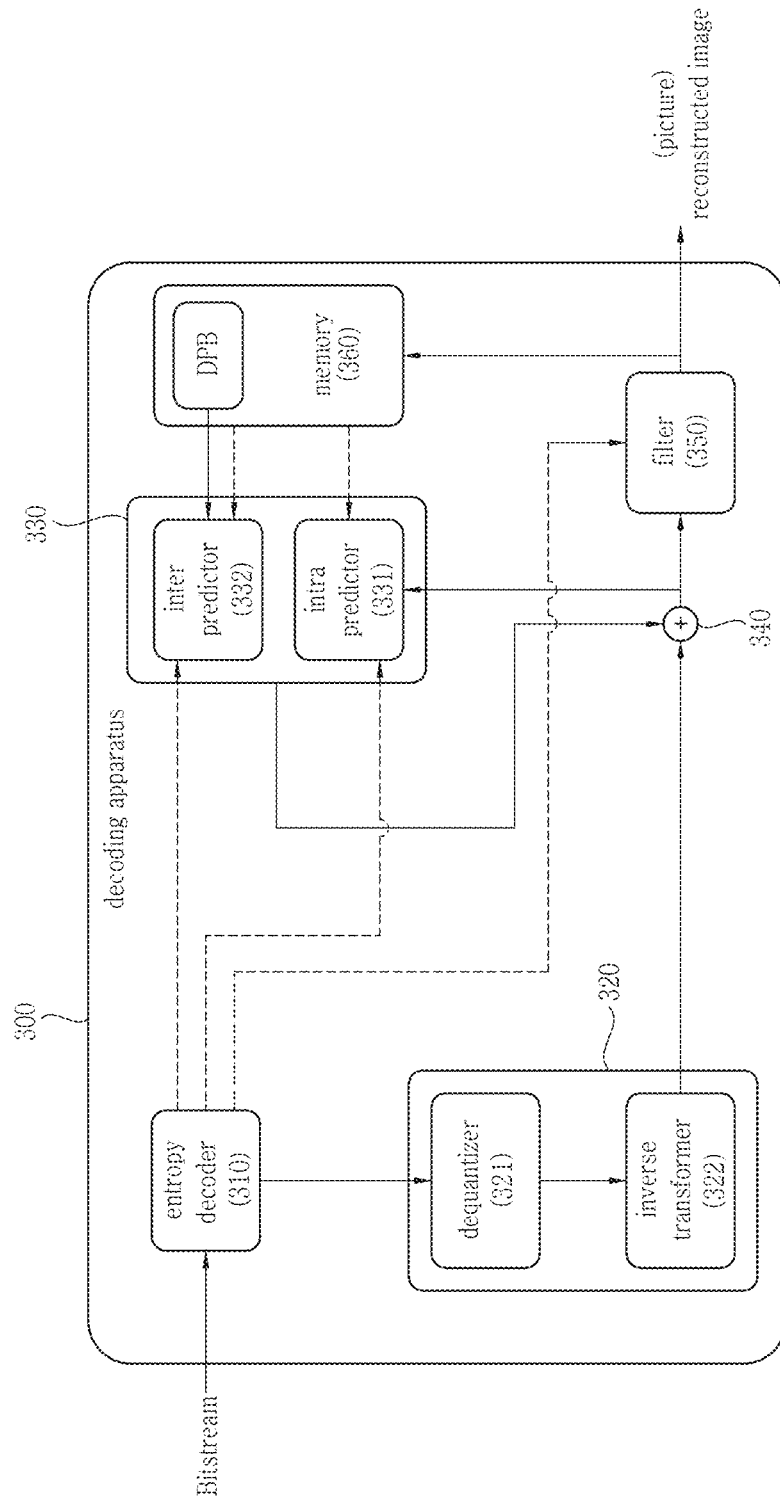
FIG. 3 is a schematic diagram illustrating a configuration of a video/image decoding apparatus to which the embodiment(s) of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350 may be configured by a hardware component (e.g., a decoder chipset or a processor) according to an embodiment. In addition, the memory 360 may include a decoded picture buffer (DPB) or may be configured by a digital storage medium. The hardware component may further include the memory 360 as an internal/external component.

When a bit stream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bit stream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bit stream, and the received signal may be decoded through the entropy decoder 310. For example, the entropy decoder 310 may parse the bit stream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bit stream. For example, the entropy decoder 310 decodes the information in the bit stream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bit stream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (e.g., quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

In the present disclosure, at least one of quantization/inverse quantization and/or transform/inverse transform may be omitted. When the quantization/inverse quantization is omitted, the quantized transform coefficients may be called transform coefficients. When the transform/inverse transform is omitted, the transform coefficients may be called coefficients or residual coefficients, or may still be called transform coefficients for uniformity of expression.

In the present disclosure, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or the information on the transform coefficient(s)), and scaled transform coefficients may be derived by inverse transforming (scaling) on the transform coefficients. Residual samples may be derived based on the inverse transforming (transforming) on the scaled transform coefficients. This may be applied/expressed in other parts of the present disclosure as well.

As described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

Intra prediction may refer to prediction that generates prediction samples for a current block based on reference samples in a picture to which the current block belongs (hereinafter, referred to as a current picture). When the intra prediction is applied to the current block, neighboring reference samples to be used for the intra prediction of the current block may be derived. The neighboring reference samples of the current block may include a sample adjacent to the left boundary of the current block of size nWxnH and a total of 2×nH samples adjacent to the bottom-left of the current block, a sample adjacent to the top boundary of the current block and a total of 2×nW samples adjacent to the top-right and a sample adjacent to the top-left of the current block. Alternatively, the neighboring reference samples of the current block may include a plurality of columns of top neighboring samples and a plurality of rows of left neighboring samples. In addition, the neighboring reference samples of the current block may include a total of nH samples adjacent to the right boundary of the current block of size nWxnH, a total of nW samples adjacent to the bottom boundary of the current block and a sample adjacent to the bottom-right of the current block.

However, some of the neighboring reference samples of the current block have not yet been decoded or may not be available. In this case, the decoder may construct neighboring reference samples to be used for prediction by substituting unavailable samples with available samples. Alternatively, neighboring reference samples to be used for prediction may be configured through interpolation of available samples.

When the neighboring reference samples are derived, (i) a prediction sample may be derived based on the average or interpolation of neighboring reference samples of the current block, or (ii) the prediction sample may be derived based on a reference sample existing in a specific (prediction) direction with respect to a prediction sample among the neighboring reference samples of the current block. The case of (i) may be called a non-directional mode or a non-angular mode, and the case of (ii) may be called a directional mode or an angular mode.

In addition, the prediction sample may be generated through interpolation of a first neighboring sample located in the prediction direction of the intra prediction mode of the current block based on the prediction sample of the current block and a second neighboring sample located in a direction opposite to the prediction direction among the neighboring reference samples. The above-described case may be referred to as linear interpolation intra prediction (LIP). In addition, chroma prediction samples may be generated based on the luma samples using a linear model (LM). This case may be called an LM mode or a chroma component LM (CCLM) mode.

In addition, a temporary prediction sample of the current block is derived based on the filtered neighboring reference samples, and a prediction sample of the current block may also be derived by weighted summing the temporary prediction sample and at least one reference sample derived according to the intra prediction mode among the existing neighboring reference samples, that is, unfiltered neighboring reference samples. The above-described case may be referred to as position dependent intra prediction (PDPC).

In addition, a reference sample line with the highest prediction accuracy among neighboring multiple reference sample lines of the current block is selected, and a prediction sample is derived using a reference sample located in the prediction direction in the selected line. In this case, intra prediction encoding may be performed by indicating (signaling) the used reference sample line to the decoding apparatus. The above-described case may be referred to as multi-reference line intra prediction or MRL-based intra prediction.

In addition, the current block is divided into vertical or horizontal sub-partitions and intra prediction is performed based on the same intra prediction mode, but neighboring reference samples may be derived and used in units of the sub-partitions. That is, in this case, the intra prediction mode for the current block is equally applied to the sub-partitions, but the intra prediction performance may be improved in some cases by deriving and using the neighboring reference samples in units of the sub-partitions. This prediction method may be called intra-prediction based on intra sub-partitions (ISP).

The above-described intra prediction methods may be called intra prediction types to be distinguished from the intra prediction mode. The intra prediction types may be referred to by various terms such as intra prediction technique or additional intra prediction modes. For example, the intra prediction types (or additional intra prediction modes, etc.) may include at least one of the aforementioned LIP, PDPC, MRL, and ISP. A general intra prediction method excluding a specific intra prediction type such as LIP, PDPC, MRL, and ISP may be referred to as a normal intra prediction type. The normal intra prediction type may be generally applied when the above specific intra prediction type is not applied, and prediction may be performed based on the above-described intra prediction mode. Meanwhile, if necessary, post-processing filtering may be performed on the derived prediction sample.

Specifically, the intra prediction process may include an intra prediction mode/type determination step, neighboring reference samples derivation step, and an intra prediction mode/type based prediction sample derivation step. In addition, if necessary, a post-filtering step may be performed on the derived prediction sample.

When intra prediction is applied, an intra prediction mode applied to the current block may be determined using an intra prediction mode of a neighboring block. For example, the decoding device may select one of most probable mode (MPM) candidates in the MPM list derived based on additional candidate modes and an intra prediction mode of the neighboring block (e.g., the left and/or top neighboring block) of the current block, or select one of the remaining intra prediction modes not included in the MPM candidates (and planar mode) based on the remaining intra prediction mode information. The MPM list may be configured to include or not include the planner mode as a candidate. For example, when the MPM list includes a planner mode as a candidate, the MPM list may have 6 candidates, and when the MPM list does not include a planner mode as a candidate, the MPM list may have 5 candidates. When the MPM list does not include the planar mode as a candidate, a not planar flag (e.g., intra_luma_not_planar_flag) representing whether the intra prediction mode of the current block is not the planar mode may be signaled. For example, the MPM flag may be signaled first, and the MPM index and not planner flag may be signaled when the value of the MPM flag is 1. Also, the MPM index may be signaled when the value of the not planner flag is 1. Here, the fact that the MPM list is configured not to include the planner mode as a candidate is that the planner mode is always considered as MPM rather than that the planner mode is not MPM, thus, the flag (not planar flag) is signaled first to check whether it is the planar mode.

For example, whether the intra prediction mode applied to the current block is among the MPM candidates (and the planar mode) or the remaining modes may be indicated based on the MPM flag (e.g., intra_luma_mpm_flag). The MPM flag with a value of 1 may indicate that the intra prediction mode for the current block is within MPM candidates (and planar mode), and The MPM flag with a value of 0 may indicate that the intra prediction mode for the current block is not within MPM candidates (and planar mode). The not planar flag (e.g., intra_luma_not_planar_flag) with a value of 0 may indicate that the intra prediction mode for the current block is a planar mode, and the not planar flag with a value of 1 may indicate that the intra prediction mode for the current block is not the planar mode. The MPM index may be signaled in the form of an mpm_idx or intra_luma_mpm_idx syntax element, and the remaining intra prediction mode information may be signaled in the form of a rem_intra_luma_pred_mode or intra_luma_mpm_remainder syntax element. For example, the remaining intra prediction mode information may indicate one of the remaining intra prediction modes not included in the MPM candidates (and planar mode) among all intra prediction modes by indexing in the order of prediction mode number. The intra prediction mode may be an intra prediction mode for a luma component (sample). Hereinafter, the intra prediction mode information may include at least one of the MPM flag (e.g., intra_luma_mpm_flag), the not planar flag (e.g., intra_luma_not_planar_flag), the MPM index (e.g., mpm_idx or intra_luma_mpm_idx), or the remaining intra prediction mode information (rem_intra_luma_luma_mpm_mode or intra_luma_mpminder). In the present disclosure, the MPM list may be referred to by various terms such as an MPM candidate list and candModeList. When the MIP is applied to the current block, a separate MPM flag (e.g., intra_mip_mpm_flag) for the MIP, an MPM index (e.g., intra_mip_mpm_idx), and remaining intra prediction mode information (e.g., intra_mip_mpm_remainder) may be signaled, and the not planar flag may not be signaled.

In other words, in general, when a block partition for an image is performed, the current block to be coded and a neighboring block have similar image characteristics. Therefore, there is a high probability that the current block and the neighboring block have the same or similar intra prediction mode. Accordingly, the encoder may use the intra prediction mode of the neighboring block to encode the intra prediction mode of the current block.

For example, the decoding device/encoding device may construct a most probable modes (MPM) list for the current block. The MPM list may be referred to as the MPM candidate list. Here, the MPM may refer to modes used to improve coding efficiency in consideration of the similarity between the current block and the neighboring blocks during intra prediction mode coding. As described above, the MPM list may be constructed to include the planar mode, or may be constructed to exclude the planar mode. For example, when the MPM list includes the planar mode, the number of candidates in the MPM list may be 6. And, when the MPM list does not include the planar mode, the number of candidates in the MPM list may be 5.

The encoder/decoder may construct an MPM list including five or six MPMs.

In order to construct the MPM list, three types of modes, such as default intra modes, neighbor intra modes, and derived intra modes, may be considered.

For the neighbor intra modes, two neighbor blocks, that is, a left neighbor block and a top neighbor block, may be considered.

As described above, if the MPM list is constructed to not include a planar mode, the planar mode may be excluded from the list, and the number of MPM list candidates may be set to five.

Furthermore, a non-directional mode (or a non-angle mode) among the intra prediction modes may include a DC mode based on an average of neighbor reference samples of a current block or an interpolation-based planar mode.

Meanwhile, when inter prediction is applied, the predictor of the encoding apparatus/decoding apparatus may derive prediction samples by performing inter prediction in units of blocks. The inter prediction may be applied when performing the prediction on the current block. That is, the predictor (more specifically, inter predictor) of the encoding/decoding apparatus may derive prediction samples by performing the inter prediction in units of the block. The inter prediction may represent prediction derived by a method dependent to the data elements (e.g., sample values or motion information) of a picture(s) other than the current picture. When the inter prediction is applied to the current block, a predicted block (prediction sample array) for the current block may be derived based on a reference block (reference sample array) specified by the motion vector on the reference picture indicated by the reference picture index. In this case, in order to reduce an amount of motion information transmitted in the inter-prediction mode, the motion information of the current block may be predicted in units of a block, a subblock, or a sample based on a correlation of the motion information between the neighboring block and the current block. The motion information may include the motion vector and the reference picture index. The motion information may further include inter-prediction type (L0 prediction, L1 prediction, Bi prediction, etc.) information. In the case of applying the inter prediction, the neighboring block may include a spatial neighboring block which is present in the current picture and a temporal neighboring block which is present in the reference picture. A reference picture including the reference block and a reference picture including the temporal neighboring block may be the same as each other or different from each other. The temporal neighboring block may be referred to as a name such as a collocated reference block, a collocated CU (colCU), etc., and the reference picture including the temporal neighboring block may be referred to as a collocated picture (colPic). For example, a motion information candidate list may be configured based on the neighboring blocks of the current block and a flag or index information indicating which candidate is selected (used) may be signaled in order to derive the motion vector and./or reference picture index of the current block. The inter prediction may be performed based on various prediction modes and for example, in the case of a skip mode and a merge mode, the motion information of the current block may be the same as the motion information of the selected neighboring block. In the case of the skip mode, the residual signal may not be transmitted unlike the merge mode. In the case of a motion vector prediction (MVP) mode, the motion vector of the selected neighboring block may be used as a motion vector predictor and a motion vector difference may be signaled. In this case, the motion vector of the current block may be derived by using a sum of the motion vector predictor and the motion vector difference.

The motion information may further include L0 motion information and/or L1 motion information according to the inter-prediction type (L0 prediction, L1 prediction, Bi prediction, etc.). A L0-direction motion vector may be referred to as an L0 motion vector or MVL0 and an L1-direction motion vector may be referred to as an L1 motion vector or MVL1. A prediction based on the L0 motion vector may be referred to as an L0 prediction, a prediction based on the L1 motion vector may be referred to as an L1 prediction, and a prediction based on both the L0 motion vector and the L1 motion vector may be referred to as a bi-prediction. Here, the L0 motion vector may indicate a motion vector associated with a reference picture list L0 and the L1 motion vector may indicate a motion vector associated with a reference picture list L1. The reference picture list L0 may include pictures prior to the current picture in an output order and the reference picture list L1 may include pictures subsequent to the current picture in the output order, as the reference pictures. The prior pictures may be referred to as a forward (reference) picture and the subsequent pictures may be referred to as a reverse (reference) picture. The reference picture list L0 may further include the pictures subsequent to the current picture in the output order as the reference pictures. In this case, the prior pictures may be first indexed in the reference picture list L0 and the subsequent pictures may then be indexed. The reference picture list L1 may further include the pictures prior to the current picture in the output order as the reference pictures. In this case, the subsequent pictures may be first indexed in the reference picture list L1 and the prior pictures may then be indexed. Here, the output order may correspond to a picture order count (POC) order.

A video/image encoding process based on inter prediction may schematically include, for example, the following.

Figure 4:
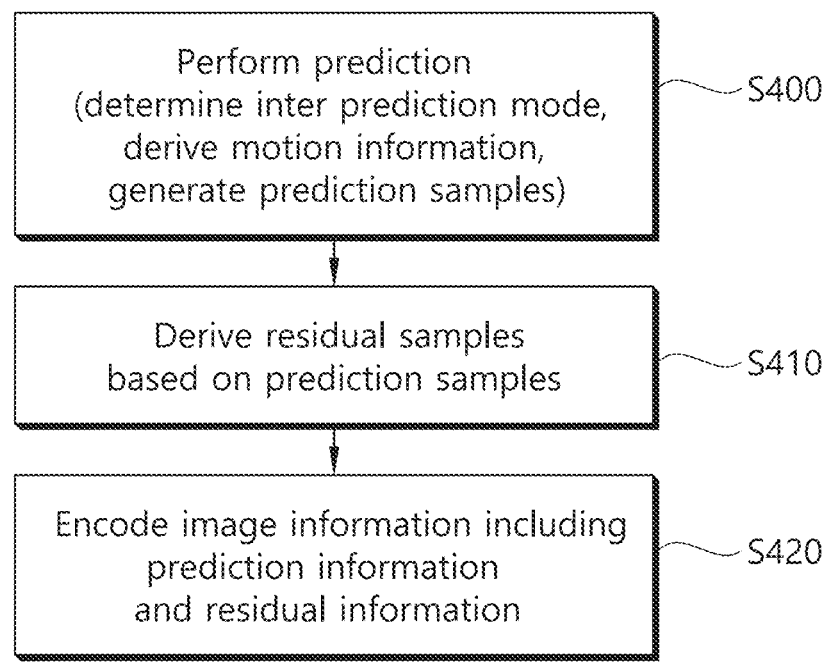
FIG. 4 illustrates an example of an inter prediction-based video/image encoding method.

FIG. 4 illustrates an example of an inter prediction-based video/image encoding method.

The encoding apparatus performs the inter prediction for the current block (S400). The encoding apparatus may derive the inter prediction mode and the motion information of the current block and generate the prediction samples of the current block. Here, an inter prediction mode determining process, a motion information deriving process, and a generation process of the prediction samples may be simultaneously performed and any one process may be performed earlier than other process. For example, the inter-prediction unit of the encoding apparatus may include a prediction mode determination unit, a motion information derivation unit, and a prediction sample derivation unit, and the prediction mode determination unit may determine the prediction mode for the current block, the motion information derivation unit may derive the motion information of the current block, and the prediction sample derivation unit may derive the prediction samples of the current block. For example, the inter-prediction unit of the encoding apparatus may search a block similar to the current block in a predetermined area (search area) of reference pictures through motion estimation and derive a reference block in which a difference from the current block is minimum or is equal to or less than a predetermined criterion. A reference picture index indicating a reference picture at which the reference block is positioned may be derived based thereon and a motion vector may be derived based on a difference in location between the reference block and the current block. The encoding apparatus may determine a mode applied to the current block among various prediction modes. The encoding apparatus may compare RD cost for the various prediction modes and determine an optimal prediction mode for the current block.

For example, when the skip mode or the merge mode is applied to the current block, the encoding apparatus may configure a merging candidate list to be described below and derive a reference block in which a difference from the current block is minimum or is equal to or less than a predetermined criterion among reference blocks indicated by merge candidates included in the merging candidate list. In this case, a merge candidate associated with the derived reference block may be selected and merge index information indicating the selected merge candidate may be generated and signaled to the decoding apparatus. The motion information of the current block may be derived by using the motion information of the selected merge candidate.

As another example, when an (A)MVP mode is applied to the current block, the encoding apparatus may configure an (A)MVP candidate list to be described below and use a motion vector of a selected mvp candidate among motion vector predictor (mvp) candidates included in the (A)MVP candidate list as the mvp of the current block. In this case, for example, the motion vector indicating the reference block derived by the motion estimation may be used as the motion vector of the current block and an mvp candidate having a motion vector with a smallest difference from the motion vector of the current block among the mvp candidates may become the selected mvp candidate. A motion vector difference (MVD) which is a difference obtained by subtracting the mvp from the motion vector of the current block may be derived. In this case, the information on the MVD may be signaled to the decoding apparatus. Further, when the (A)MVP mode is applied, the value of the reference picture index may be configured as reference picture index information and separately signaled to the decoding apparatus.

The encoding apparatus may derive the residual samples based on the predicted samples (S410). The encoding apparatus may derive the residual samples by comparing original samples and the prediction samples of the current block.

The encoding apparatus encodes image information including prediction information and residual information (S420). The encoding apparatus may output the encoded image information in the form of a bit stream. The prediction information may include information on prediction mode information (e.g., skip flag, merge flag or mode index, etc.) and information on motion information as information related to the prediction procedure. The information on the motion information may include candidate selection information (e.g., merge index, mvp flag or mvp index) which is information for deriving the motion vector. Further, the information on the motion information may include the information on the MVD and/or the reference picture index information. Further, the information on the motion information may include information indicating whether to apply the L0 prediction, the L1 prediction, or the bi-prediction. The residual information is information on the residual samples. The residual information may include information on quantized transform coefficients for the residual samples.

An output bit stream may be stored in a (digital) storage medium and transferred to the decoding apparatus or transferred to the decoding apparatus via the network.

Meanwhile, as described above, the encoding apparatus may generate a reconstructed picture (including reconstructed samples and reconstructed blocks) based on the reference samples and the residual samples. This is to derive the same prediction result as that performed by the decoding apparatus, and as a result, coding efficiency may be increased. Accordingly, the encoding apparatus may store the reconstruction picture (or reconstruction samples or reconstruction blocks) in the memory and utilize the reconstruction picture as the reference picture. The in-loop filtering process may be further applied to the reconstruction picture as described above.

A video/image decoding process based on inter prediction may schematically include, for example, the following.

Figure 5:
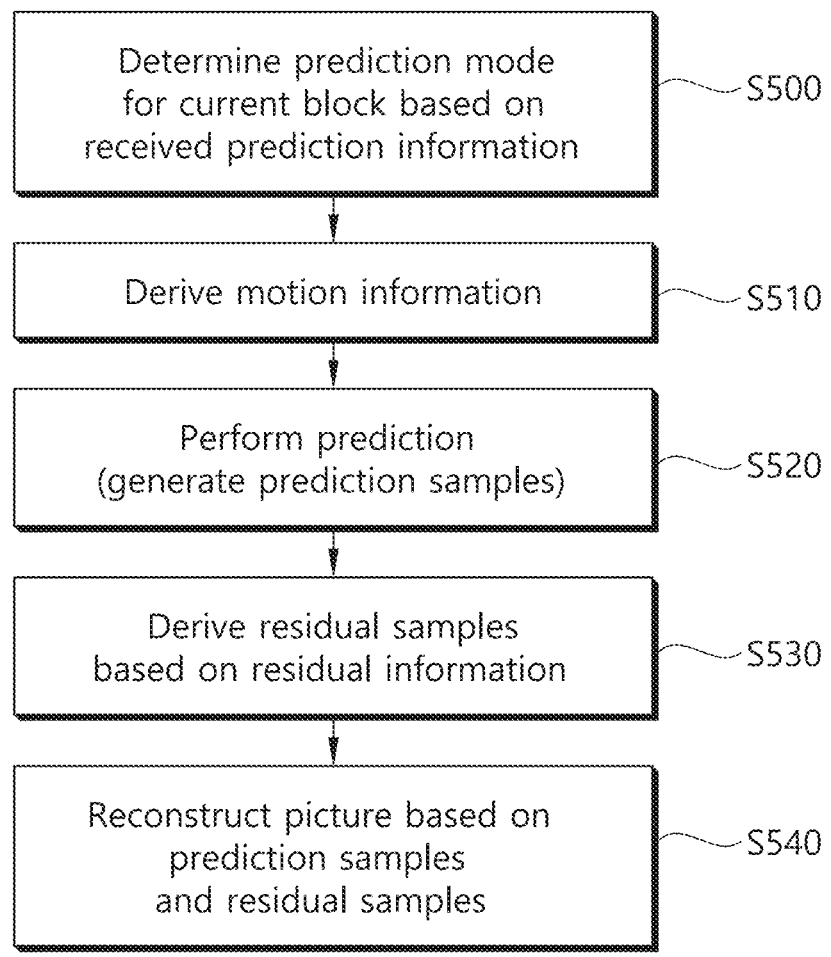
FIG. 5 illustrates an example of an inter prediction-based video/image decoding method.

FIG. 5 illustrates an example of an inter prediction-based video/image decoding method.

Referring to FIG. 5, the decoding apparatus may perform an operation corresponding to the operation performed by the encoding apparatus. The decoding apparatus may perform the prediction for the current block based on received prediction information and derive the prediction samples.

Specifically, the decoding apparatus may determine the prediction mode for the current block based on the received prediction information (S500). The decoding apparatus may determine which inter prediction mode is applied to the current block based on the prediction mode information in the prediction information.

For example, it may be determined whether the merge mode or the (A)MVP mode is applied to the current block based on the merge flag. Alternatively, one of various inter prediction mode candidates may be selected based on the mode index. The inter prediction mode candidates may include a skip mode, a merge mode, and/or an (A)MVP mode or may include various inter prediction modes to be described below.

The decoding apparatus derives the motion information of the current block based on the determined inter prediction mode (S510). For example, when the skip mode or the merge mode is applied to the current block, the decoding apparatus may configure the merge candidate list to be described below and select one merge candidate among the merge candidates included in the merge candidate list. Here, the selection may be performed based on the selection information (merge index). The motion information of the current block may be derived by using the motion information of the selected merge candidate. The motion information of the selected merge candidate may be used as the motion information of the current block.

As another example, when an (A)MVP mode is applied to the current block, the decoding apparatus may configure an (A)MVP candidate list to be described below and use a motion vector of a selected mvp candidate among motion vector predictor (mvp) candidates included in the (A)MVP candidate list as the mvp of the current block. Here, the selection may be performed based on the selection information (mvp flag or mvp index). In this case, the MVD of the current block may be derived based on the information on the MVD, and the motion vector of the current block may be derived based on the mvp of the current block and the MVD. Further, the reference picture index of the current block may be derived based on the reference picture index information. The picture indicated by the reference picture index in the reference picture list for the current block may be derived as the reference picture referred for the inter prediction of the current block.

Meanwhile, as described below, the motion information of the current block may be derived without a candidate list configuration and in this case, the motion information of the current block may be derived according to a procedure disclosed in the prediction mode. In this case, the candidate list configuration may be omitted.

The decoding apparatus may generate the prediction samples for the current block based on the motion information of the current block (S520). In this case, the reference picture may be derived based on the reference picture index of the current block and the prediction samples of the current block may be derived by using the samples of the reference block indicated by the motion vector of the current block on the reference picture. In this case, in some cases, a predicted sample filtering procedure for all or some of the prediction samples of the current block may be further performed.

For example, the inter-prediction unit of the decoding apparatus may include a prediction mode determination unit, a motion information derivation unit, and a prediction sample derivation unit, and the prediction mode determination unit may determine the prediction mode for the current block based on the received prediction mode information, the motion information derivation unit may derive the motion information (the motion vector and/or reference picture index) of the current block based on the information on the received motion information, and the prediction sample derivation unit may derive the predicted samples of the current block.

The decoding apparatus generates the residual samples for the current block based on the received residual information (S530). The decoding apparatus may generate the reconstruction samples for the current block based on the prediction samples and the residual samples and generate the reconstruction picture based on the generated reconstruction samples (S540). Thereafter, the in-loop filtering procedure may be further applied to the reconstruction picture as described above.

Figure 6:
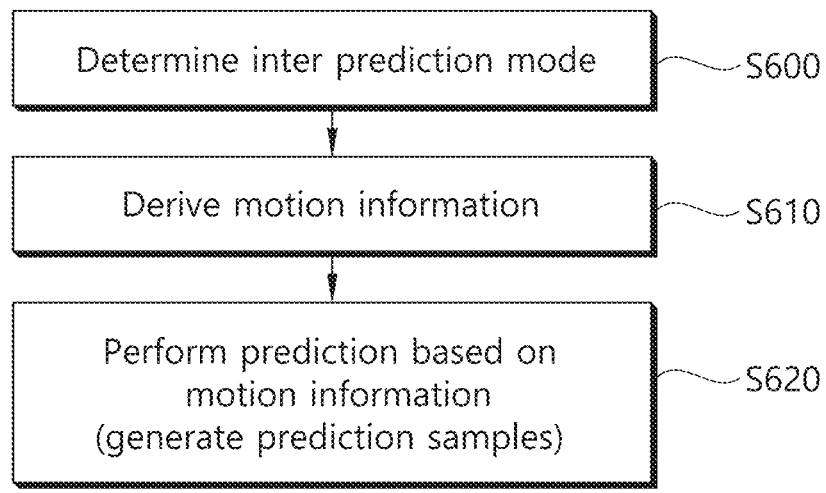
FIG. 6 schematically shows an inter prediction procedure.

FIG. 6 schematically shows an inter prediction procedure.

Referring to FIG. 6, as described above, the inter prediction process may include an inter prediction mode determination step, a motion information derivation step according to the determined prediction mode, and a prediction processing (prediction sample generation) step based on the derived motion information. The inter prediction process may be performed by the encoding apparatus and the decoding apparatus as described above. In this document, a coding device may include the encoding apparatus and/or the decoding apparatus.

Referring to FIG. 6, the coding apparatus determines an inter prediction mode for the current block (S600). Various inter prediction modes may be used for the prediction of the current block in the picture. For example, various modes, such as a merge mode, a skip mode, a motion vector prediction (MVP) mode, an affine mode, a subblock merge mode, a merge with MVD (MMVD) mode, and a historical motion vector prediction (HMVP) mode may be used. A decoder side motion vector refinement (DMVR) mode, an adaptive motion vector resolution (AMVR) mode, a bi-prediction with CU-level weight (BCW), a bi-directional optical flow (BDOF), and the like may be further used as additional modes. The affine mode may also be referred to as an affine motion prediction mode. The MVP mode may also be referred to as an advanced motion vector prediction (AMVP) mode. In the present document, some modes and/or motion information candidates derived by some modes may also be included in one of motion information-related candidates in other modes. For example, the HMVP candidate may be added to the merge candidate of the merge/skip modes, or also be added to an mvp candidate of the MVP mode. If the HMVP candidate is used as the motion information candidate of the merge mode or the skip mode, the HMVP candidate may be referred to as the HMVP merge candidate.

The prediction mode information indicating the inter prediction mode of the current block may be signaled from the encoding apparatus to the decoding apparatus. In this case, the prediction mode information may be included in the bit stream and received by the decoding apparatus. The prediction mode information may include index information indicating one of multiple candidate modes. Alternatively, the inter prediction mode may be indicated through a hierarchical signaling of flag information. In this case, the prediction mode information may include one or more flags. For example, whether to apply the skip mode may be indicated by signaling a skip flag, whether to apply the merge mode may be indicated by signaling a merge flag when the skip mode is not applied, and it is indicated that the MVP mode is applied or a flag for additional distinguishing may be further signaled when the merge mode is not applied. The affine mode may be signaled as an independent mode or signaled as a dependent mode on the merge mode or the MVP mode. For example, the affine mode may include an affine merge mode and an affine MVP mode.

The coding apparatus derives motion information for the current block (S610). Motion information derivation may be derived based on the inter prediction mode.

The coding apparatus may perform inter prediction using motion information of the current block. The encoding apparatus may derive optimal motion information for the current block through a motion estimation procedure. For example, the encoding apparatus may search a similar reference block having a high correlation in units of a fractional pixel within a predetermined search range in the reference picture by using an original block in an original picture for the current block and derive the motion information through the searched reference block. The similarity of the block may be derived based on a difference of phase based sample values. For example, the similarity of the block may be calculated based on a sum of absolute differences (SAD) between the current block (or a template of the current block) and the reference block (or the template of the reference block). In this case, the motion information may be derived based on a reference block having a smallest SAD in a search area. The derived motion information may be signaled to the decoding apparatus according to various methods based on the inter prediction mode.

The coding apparatus performs inter prediction based on motion information for the current block (S620). The coding apparatus may derive prediction sample(s) for the current block based on the motion information. A current block including prediction samples may be referred to as a predicted block.

Meanwhile, as described above, the encoding apparatus may perform various encoding methods such as exponential Golomb, context-adaptive variable length coding (CAVLC), and context-adaptive binary arithmetic coding (CABAC). In addition, the decoding apparatus may decode information in a bitstream based on a coding method such as exponential Golomb coding, CAVLC or CABAC, and output a value of a syntax element required for image reconstruction and quantized values of transform coefficients related to residuals.

For example, the coding methods described above may be performed as described below.

Figure 7:
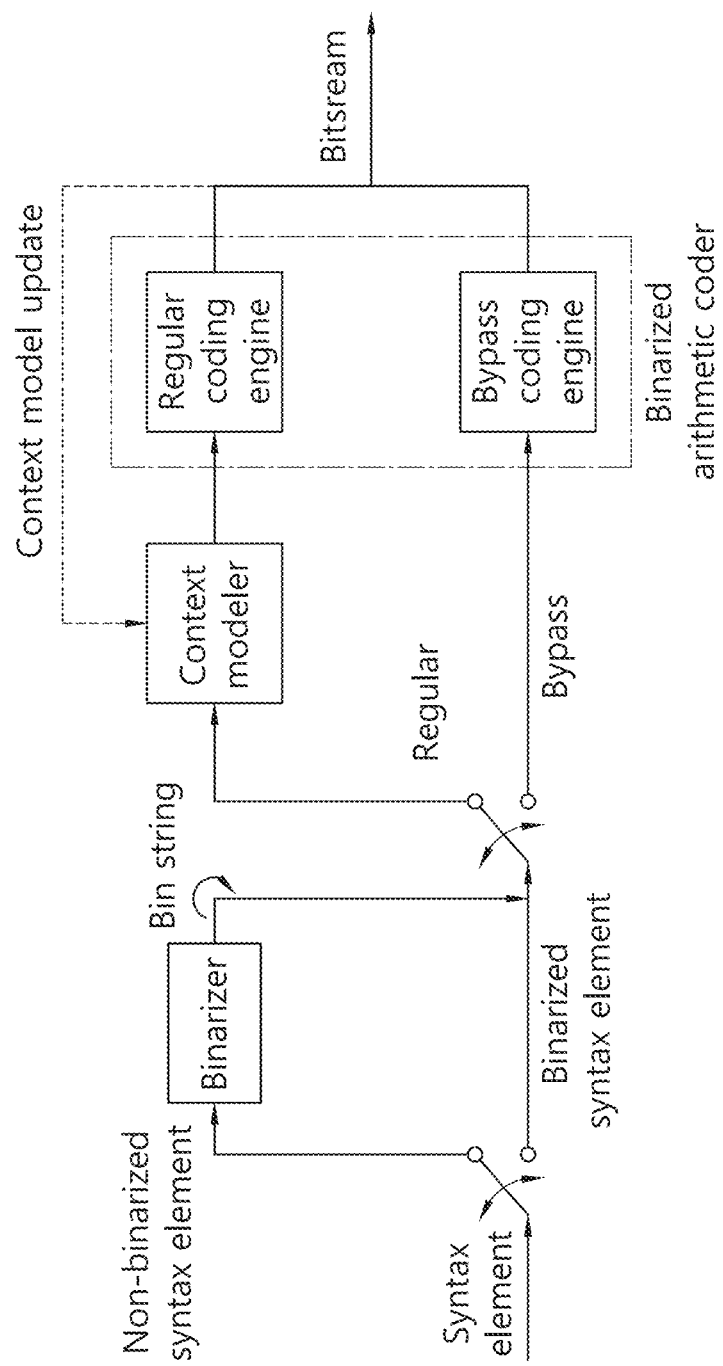
FIG. 7 exemplarily shows context-adaptive binary arithmetic coding (CABAC) for encoding a syntax element.

FIG. 7 exemplarily shows context-adaptive binary arithmetic coding (CABAC) for encoding a syntax element. For example, in the CABAC encoding process, when an input signal is a syntax element, rather than a binary value, the encoding apparatus may convert the input signal into a binary value by binarizing the value of the input signal. In addition, when the input signal is already a binary value (i.e., when the value of the input signal is a binary value), binarization may not be performed and may be bypassed. Here, each binary number 0 or 1 constituting a binary value may be referred to as a bin. For example, if a binary string after binarization is 110, each of 1, 1, and 0 is called one bin. The bin(s) for one syntax element may indicate a value of the syntax element.

Thereafter, the binarized bins of the syntax element may be input to a regular coding engine or a bypass coding engine. The regular coding engine of the encoding apparatus may allocate a context model reflecting a probability value to the corresponding bin, and may encode the corresponding bin based on the allocated context model. The regular coding engine of the encoding apparatus may update a context model for each bin after performing encoding on each bin. A bin encoded as described above may be referred to as a context-coded bin.

Meanwhile, when the binarized bins of the syntax element are input to the bypass coding engine, they may be coded as follows. For example, the bypass coding engine of the encoding apparatus omits a procedure of estimating a probability with respect to an input bin and a procedure of updating a probability model applied to the bin after encoding. When bypass encoding is applied, the encoding apparatus may encode the input bin by applying a uniform probability distribution instead of allocating a context model, thereby improving an encoding rate. The bin encoded as described above may be referred to as a bypass bin.

Entropy decoding may represent a process of performing the same process as the entropy encoding described above in reverse order.

For example, when a syntax element is decoded based on a context model, the decoding apparatus may receive a bin corresponding to the syntax element through a bitstream, determine a context model using the syntax element and decoding information of a decoding target block or a neighbor block or information of a symbol/bin decoded in a previous stage, predict an occurrence probability of the received bin according to the determined context model, and perform an arithmetic decoding on the bin to derive a value of the syntax element. Thereafter, a context model of a bin which is decoded next may be updated with the determined context model.

Also, for example, when a syntax element is bypass-decoded, the decoding apparatus may receive a bin corresponding to the syntax element through a bitstream, and decode the input bin by applying a uniform probability distribution. In this case, the procedure of the decoding apparatus for deriving the context model of the syntax element and the procedure of updating the context model applied to the bin after decoding may be omitted.

As described above, residual samples may be derived as quantized transform coefficients through transform and quantization processes. The quantized transform coefficients may also be referred to as transform coefficients. In this case, the transform coefficients in a block may be signaled in the form of residual information. The residual information may include a residual coding syntax. That is, the encoding apparatus may configure a residual coding syntax with residual information, encode the same, and output it in the form of a bitstream, and the decoding apparatus may decode the residual coding syntax from the bitstream and derive residual (quantized) transform coefficients. The residual coding syntax may include syntax elements representing whether transform was applied to the corresponding block, a location of a last effective transform coefficient in the block, whether an effective transform coefficient exists in the subblock, a size/sign of the effective transform coefficient, and the like, as will be described later.

For example, the (quantized) transformation coefficients (i.e., the residual information) may be encoded and/or decoded based on syntax elements such as transform_skip_flag, last_sig_coeff_x_prefix, last_sig_coeff_y_prefix, last_sig_coeff_x_suffix, last_sig_coeff_y_suffix, coded_sub_block_flag, sig_coeff_flag, par_level_flag, abs_level_gt1_flag, abs_level_gt3_flag, abs_remainder, coeff_sign_flag, dec_abs_level, mts_idx. Syntax elements related to residual data encoding/decoding may be represented as shown in the following table.

TABLE 1

|  | Descriptor |
|---|---|
| residual_coding( x0, y0, log2TbWidth, log2ThHeight, cIdx ) { | |
|   if( transform_skip_enabled_flag && ( cIdx != 0 \|\| tu_mts_flag[ x0 ][ y0 ] = = 0 ) && | |
|     ( log2TbWidth <= 2 ) && ( log2TbHeight <= 2 ) ) | |
|     transform_skip_flag[ x0 ][ y0 ][ cIdx ] | ae(v) |
|   last_sig_coeff_x_prefix | ae(v) |
|   last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ac(v) |
|   log2SbSize = ( Min( log2TbWidth, log2TbHeight ) < 2 ? 1 : 2 ) | |
|   numSbCocff = 1 << ( log2SbSize << 1 ) | |
|   lastScanPos = numSbCoeff | |
|   lastSubBlock = ( 1 << ( log2TbWidth + log2TbHeight − 2 * log2SbSize, ) ) − 1 | |
|   do { | |
|     if( lastScanPos = = 0 ) { | |

TABLE 1-continued

| | Descriptor |
|---|---|
| ```
        lastScanPos = numSbCoeff
        lastSubBlock− −
      }
      lastScanPos− −
      xS = DiagScanOrder[ log2TbWidth − log2SbSize ][ log2TbHeight − log2SbSize ]
                      [ lastSubBlock ][ 0 ]
      yS = DiagScanOrder[ log2TbWidth − log2SbSize ][ log2TbHeight − log2SbSize ]
                      [ lastSubBlock ][ 1 ]
      xC = ( xS << log2SbSize ) +
          DiagScanOrder[ log2SbSize ][ log2SbSize ][ lastScanPos ][ 0 ]
      yC = ( yS << log2SbSize ) +
          DiagScanOrder[ log2SbSize ][ log2SbSize ][ lastScanPos ][ 1 ]
    } while( ( xC != LastSignificantCoeffX ) | | ( yC != LastSignificantCoeffY ) )
    numSigCoeff = 0
    QState = 0
    for( i = lastSubBlock; i <= 0; 1− − ) {
      startQStateSb = QState
      xS = DiagScanOrder[ log2TbWidth − log2SbSize ][ log2TbHeight − log2SbSize ]
                      [ lastSubBlock ][ 0 ]
      yS = DiagScanOrder[ log2TbWidth − log2SbSize ][ log2TbHeight − log2SbSize]
                      [ lastSubBlock ][ 1 ]
      inferSbDcSigCoeffFlag = 0
      if( ( i < lastSubBlock ) && ( i > 0 ) ) {
        coded_sub_block_flag[ xS ][ yS ]
        inferSbDcSigCoeffFlag = 1
      }
      firstSigScanPosSb = numSbCoeff
      lastSigScanPosSb = −1
      remBinsPass1 = ( log2SbSize < 2 ? 6 : 28 )
      remBinsPass2 = ( log2SbSize < 2 ? 2: 4 )
      firstPosMode0 = ( i = = lastSubBlock ? lastScanPos − 1 : numSbCoeff − 1 )
      firstPosMode1 − −1
      firstPosMode2 = −1
      for( n = ( i = = firstPosMode0; n >= 0 && remBinsPass1 >= 3; n− − ) {
        xC = ( xS << log2SbSize ) + DiagScanOrder[ log2SbSize ][ log2SbSize ][ n ][ 0 ]
        yC = ( yS << log2SbSize ) + DiagScanOrder[ log2SbSize ][ log2SbSize ][ n ][ 1 ]
        if( coded_sub_block_flag[ xS ][ yS ] && ( n > 0 | | !inferSbDcSigCoeffFlag ) ) {
          sig_coeff_flag[ xC ][ yC ]
          remBinsPass1− −
          if( sig_coeff_flag[ xC ][ yC ] )
            inferSbDcSigCoeffFlag = 0
        }
        if( sig_coeff_flag[ xC ][ yC ] ) {
          numSigCoeff++
          abs_level_gt1_flag[ n ]
          remBinsPass1− −
          if( abs_level_gt1_flag[ n ] ) {
            par_level_flag[ n ]
            remBinsPass1
            if( remBinsPass2 > 0 ) {
              remBinsPass2− −
              if( remBinsPass2 = = 0 )
                firstPosMode1 = n − 1
            }
          }
          if( lastSigScanPosSb = = −1 )
            lastSigScanPosSb = n
          firstSigScanPosSb = n
        }
        AbsLevelPass1[ xC ][ yC ] =
          sig_coeff_flag[ xC ][ yC ] + par_level_flag[ n ] + abs_level_gt1_flag[ n ]
        if( dep_quant_enabled_flag )
          QState = QStateTransTable[ QState ][ AbsLevelPass1[ xC ][ yC ] & 1 ]
        if( remBinsPass1 < 3 )
          firstPosMode2 = n − 1
      }
      if( firstPosMode1 < firstPosMode2 )
        firstPosMode1 = firstPosMode2
      for( n = numSbCoeff − 1; n >= firstPosMode2; n− − )
        if( abs_level_gt1_flag,[ n ] )
          abs_level_gt3_flag[ n ]
      for( n = numSbCoeff − 1; n >= firstPosMode1; n− − ) {
        xC = ( xS << log2SbSize ) + DiagScanOrder[ log2SbSize ][ log2SbSize ][ n ][ 0 ]
        yC = ( yS << log2SbSize ) + DiagScanOrder[ log2SbSize ][ log2SbSize ][ n ][ 1 ]
        if( abs_level_gt3_flag[n ] )
          abs_remainder[ n ]
        AbsLevel[ xC ][ yC ] = AbsLevelPass1[ xC ][ yC ] +
                2 * ( abs_level_gt3_flag[ n ] + abs_remainder[ n ] )
``` | ae(v)<br><br><br><br><br><br><br><br><br><br><br><br><br><br><br><br><br><br>ae(v)<br><br><br>ae(v)<br><br>ae(v)<br><br><br><br><br><br><br><br><br><br><br><br><br><br><br><br><br><br><br><br><br><br>ae(v)<br><br><br><br>ae(v) |

TABLE 1-continued

Descriptor

```
        }
        for( n = firstPosMode1; n > firstPosMode2; n - - ) {
            xC = ( xS << log2SbSize ) + DiagScanOrder[ log2SbSize ][ log2SbSize ][ n ][ 0 ]
            yC = ( yS << log2SbSize ) + DiagScanOrder[ log2SbSize ][ log2SbSize ][ n ][ 1 ]
            if( abs_level_gt1_flag[ n ] )
                abs_remainder[ n ]                                                              ae(v)
            AbsLevel[ xC ][ yC ] = AbsLevelPass1[ xC ][ yC ] | 2 * abs_remainder[ n ]
        }
        for( n = firstPosMode2; n >= 0; n ) {
            XC = ( xS << log2SbSize ) + DiagScanOrder[ log2SbSize ][ log2SbSize ][ n ][ 0 ]
            yC = ( yS << log2SbSize ) + DiagScanOrder[ log2SbSize ][ log2SbSize ][ n ][ 1 ]
            dec_abs_level[ n ]                                                                  ae(v)
            if( AbsLevel[ xC ][ yC ] > 0 )
                firstSigScanPosSb = n
            if( dep_quant_enabled_flag )
                QState = QStateTransTable[ QState ][ AbsLevel[ xC ][ yC ] & 1 ]
        }
        if( dep_quant_enabled_flag | !sign_data_hiding_enabled_flag )
            signHidden = 0
        else
            signHidden = ( lastSigScanPosSb - firstSigScanPosSb > 3 ? 1 : 0 )
        for( n = numSbCoeff - 1; n >= 0; n - - ) {
            xC = ( xS << log2SbSize ) + DiagScanOrder[ log2SbSize ][ log2SbSize ][ n ][ 0 ]
            yC = ( yS << log2SbSize ) + DiagScanOrder[ log2SbSize ][ log2SbSize ][ n ][ 1 ]
            if( sig_coeff_flag[ xC ][ yC ] &&
                ( !signHidden | | ( n != firstSigScanPosSb ) ) )
                coeff_sign_flag[ n ]                                                            ae(v)
        }
        if( dep_quant_enabled_flag ) {
            QState = startQStateSb
            for( n = numSbCoeff - 1; n >= 0; n - - ) {
                xC = ( xS << log2SbSize ) +
                    DiagScanOrder[ log2SbSize ][ log2SbSize ][ n ][ 0 ]
                yC = ( yS << log2SbSize ) +
                    DiagScanOrder[ log2SbSize ][ log2SbSize ][ n ][ 1 ]
                if( sig_coeff_flag[ xC ][ yC ] )
                    TransCoeffLevel[ x0 ][ y0 ][ cIdx ][ xC ][ yC ] =
                        ( 2 * AbsLevel[ xC ][ yC ] - ( QState > 1 ? 1 : 0 ) ) *
                        ( 1 - 2 * coeff_sign_flag[ n ] )
                QState = QStateTransTable[ QState ][ par_level_flag[ n ] ]
            }
        } else {
            sumAbsLevel = 0
            for( n = numSbCoeff- 1; n >= 0; n - - ) {
                xC = ( xS << log2SbSize ) +
                    DiagScanOrded[ log2SbSize ][ log2SbSize ][ n ][ 0 ]
                yC = ( yS << log2SbSize ) +
                    DiagScanOrder[ log2SbSize ][ log2SbSize ][ n ][ 1 ]
                if( sig_coeff_flag[ xC ][ yC ] ) {
                    TransCoeffLevel[ x0 ][ y0 ][ cIdx ][ xC ][ yC ] =
                        AbsLevel[ xC ][ yC ] * ( 1 2 * coeff_sign_flag[ n ] )
                    if( signHidden ) {
                        sumAbsLevel -= AbsLevel[ xC ][ yC ]
                        if( ( n = = firstSigScanPosSb ) && ( sumAbsLevel % 2 ) = = 1 ) )
                            TransCoeffLevel[ x0 ][ y0 ][ cIdx ][ xC ][ yC ] =
                                -TransCoeffLevel[ x0 ][ y0 ][ cIdx ][ xC ][ yC ]
                    }
                }
            }
        }
    }
    if( tu_mts_flag[ x0 ][ y0 ] && ( cIdx = = 0 ) )
        mts_idx[ x0 ][ y0 ][ cIdx ]                                                             ae(v)
}
``` transform_skip_flag indicates whether transform is skipped in an associated block. The transform_skip_flag may be a syntax element of a transform skip flag. The associated block may be a coding block (CB) or a transform block (TB). Regarding transform (and quantization) and residual coding procedures, CB and TB may be used interchangeably. For example, as described above, residual samples may be derived for CB, and (quantized) transform coefficients may be derived through transform and quantization for the residual samples, and through the residual coding procedure, information (e.g., syntax elements) efficiently indicating a position, magnitude, sign, etc. of the (quantized) transform coefficients may be generated and signaled. The quantized transform coefficients may simply be called transform coefficients. In general, when the CB is not larger than a maximum TB, a size of the CB may be the same as a size of the TB, and in this case, a target block to be transformed (and quantized) and residual coded may be called a CB or a TB. Meanwhile, when the CB is greater than the maximum TB, a target block to be transformed (and quantized) and residual coded may be called a TB. Hereinafter, it will be described that syntax elements related to residual coding are signaled in units of transform blocks (TBs) but this is an example and the TB may be used interchangeably with coding blocks (CBs as described above.

Meanwhile, syntax elements which are signaled after the transform skip flag is signaled may be the same as the syntax elements disclosed in Table 2 below, and detailed descriptions on the syntax elements are described below.

TABLE 2

|  | Descriptor |
|---|---|
| transform_unit( x0, y0, tbWidth, tbHeight, treeType, subTuIndex, chType ) { | |
|   if( IntraSubPartitionsSplitType != ISP_NO_SPLIT && | |
|       treeType = = SINGLE_TREE && subTuIndex = = NumIntraSubPartitions − 1 ) { | |
|     xC = CbPosX[ chType ][ x0 ][ y0 ] | |
|     yC = CbPosY[ chType ][ x0 ][ y0 ] | |
|     wC = CbWidth[ chType ][ x0 ][ y0 ] / SubWidthC | |
|     hC = CbHeight[ chType ][ x0 ][ y0 ] / SubHeightC | |
|   } else { | |
|     xC = x0 | |
|     yC = y0 | |
|     wC = tbWidth / SubWidthC | |
|     hC = tbHeight / SubHeightC | |
|   } | |
|   chromaAvailable = treeType != DUAL_TREE_LUMA && sps_chroma_format_idc != 0 && | |
|     ( IntraSubPartitionsSplitType = = ISP_NO_SPLIT \|\| | |
|     ( IntraSubPartitionsSplitType != ISP_NO_SPLIT && | |
|     subTuIndex = = NumIntraSubPartitions − 1 ) ) | |
|   if( ( treeType = = SINGLE_TREE \|\| treeType = = DUAL_TREE_CHROMA ) && | |
|     sps_chroma_format_idc != 0 && | |
|     ( ( IntraSubPartitionsSplitType = = ISP_NO_SPLIT && !( cu_sbt_flag && | |
|     ( ( subTuIndex = = 0 && cu_sbt_pos_flag ) \|\| | |
|     ( subTuIndex = = 1 && !cu_sbt_pos_flag ) ) ) ) \|\| | |
|     ( IntraSubPartitionsSplitType != ISP_NO_SPLIT && | |
|     ( subTuIndex = = NumIntraSubPartitions − 1 ) ) ) ) { | |
|     tu_cb_coded_flag[ xC ][ yC ] | ae(v) |
|     tu_cr_coded_flag[ xC ][ yC ] | ae(v) |
|   } | |
|         if( treeType = = SINGLE_TREE \|\| treeType = = DUAL_TREE_LUMA ) { | |
|           if( ( IntraSubPartitionsSplitType = = ISP_NO_SPLIT && !( cu_sbt_flag && | |
|             ( ( subTuIndex = = 0 && cu_sbt_pos_flag ) \|\| | |
|             ( subTuIndex = = 1 && !cu_sbt_pos_flag ) ) ) && | |
|             ( ( CuPredMode[ chType ][ x0 ][ y0 ] = = MODE_INTRA && | |
|             !cu_act_enabled_flag[ x0 ][ y0 ] ) \|\| | |
|             ( chromaAvailable && ( tu_cb_coded_flag[ xC ][ yC ] \|\| | |
|             tu_cr_coded_flag[ xC ][ yC ] ) ) \|\| | |
|             CbWidth[ chType ][ x0 ][ y0 ] > MaxTbSizeY \|\| | |
|             CbHeight[ chType ][ x0 ][ y0 ] > MaxTbSizeY ) ) \|\| | |
|           ( IntraSubPartitionsSplitType != ISP_NO_SPLIT && | |
|           ( subTuIndex < NumIntraSubPartitions − 1 \|\| \|InferTuCbfLuma ) ) ) | |
|           tu_y_coded_flag[ x0 ][ y0 ] | ae(v) |
|         if(IntraSubPartitionsSplitType != ISP_NO_SPLIT ) | |
|           InferTuCbfLuma = InferTuCbfLuma && !tu_y_coded_flag[ x0 ][ y0 ] | |
|         } | |
|      if( ( CbWidth[ chType ][ x0 ][ y0 ] > 64 \|\| CbHeight[ chType ][ x0 ][ y0 ] > 64 \|\| | |
|         tu_y_coded_flag[ x0 ][ y0 ] \|\| ( chromaAvailable && ( tu_cb_coded_flag[ xC ][ yC ] \|\| | |
|         tu_cr_coded_flag[ xC ][ yC ] ) ) && treeType != DUAL_TREE_CHROMA && | |
|         pps_cu_qp_delta_enabled_flag && !IsCuQpDeltaCoded ) { | |
|         cu_qp_delta_abs | ae(v) |
|         if( cu_qp_delta_abs ) | |
|           cu_qp_delta_sign_flag | ae(v) |
|         } | |
|      if( ( CbWidth[ chType ][ x0 ][ y0 ] > 64 \|\| CbHeight[ chType ][ x0 ][ y0 ] > 64 \|\| | |
|         ( chromaAvailable && ( tu_cb_coded_flag[ xC ][ yC ] \|\| | |
|         tu_cr_coded_flag[ xC ][ yC ] ) ) ) && | |
|         treeType != DUAL_TREE_LUMA && sh_cu_chroma_qp_offset_enabled_flag && | |
|         !IsCuChromaQpOffsetCoded ) { | |
|         cu_chroma_qp_offset_flag | ae(v) |

TABLE 2-continued

| | Descriptor |
|---|---|
| ⠀⠀⠀⠀⠀⠀if( cu_chroma_qp_offset_flag && pps_chroma_qp_offset_list_len_minus1 > 0 ) | |
| ⠀⠀⠀⠀⠀⠀⠀⠀cu_chroma_qp_offset_idx | ae(v) |
| ⠀⠀⠀}⠀⠀⠀ | |
| ⠀⠀⠀if( sps_joint_cbcr_enabled_flag && ( ( CuPredMode[ chType ][ x0 ][ y0 ] = = MODE_INTRA | |
| ⠀⠀⠀⠀⠀&& ( tu_cb_coded_flag[ xC ][ yC ] \|\| tu_cr_coded_flag[ xC ][ yC ] ) ) \|\| | |
| ⠀⠀⠀⠀⠀( tu_cb_coded_flag[ xC ][ yC ] && tu_cr_coded_flag[ xC ][ yC ] ) ) && | |
| ⠀⠀⠀⠀⠀chromaAvailable ) | |
| ⠀⠀⠀⠀tu_joint_cbcr_residual_flag[ xC ][ yC ] | ae(v) |
| ⠀⠀⠀if( tu_y_coded_flag[ x0 ][ y0 ] && treeType != DUAL_TREE_CHROMA ) { | |
| ⠀⠀⠀⠀if( sps_transform_skip_enabled_flag && !BdpcmFlag[ x0 ][ y0 ][ 0 ] && | |
| ⠀⠀⠀⠀⠀⠀tbWidth <= MaxTsSize && tbHeight <= MaxTsSize && | |
| ⠀⠀⠀⠀⠀⠀( IntraSubPartitionsSplitType = = ISP_NO_SPLIT ) && !cu_sbt_flag ) | |
| ⠀⠀⠀⠀⠀transform_skip_flag[ x0 ][ y0 ][ 0 ] | ae(v) |
| ⠀⠀⠀⠀if( !transform_skip_flag[ x0 ][ y0 ][ 0 ] \|\| sh_ts_residual_coding_disabled_flag ) | |
| ⠀⠀⠀⠀⠀residual_coding( x0, y0, Log2( tbWidth ), Log2( tbHeight ), 0 ) | |
| ⠀⠀⠀⠀else | |
| ⠀⠀⠀⠀⠀residual_ts_coding( x0, y0, Log2( tbWidth ), Log2( tbHeight ), 0 ) | |
| ⠀⠀⠀}⠀⠀ | |
| ⠀⠀⠀if( tu_cb_coded_flag[ xC ][ yC ] && treeType != DUAL_TREE_LUMA ) { | |
| ⠀⠀⠀⠀if( sps_transform_skip_enabled_flag && !BdpcmFlag[ x0 ][ y0 ][ 1 ] && | |
| ⠀⠀⠀⠀⠀⠀wC <= MaxTsSize && hC <= MaxTsSize && !cu_sbt_flag ) | |
| ⠀⠀⠀⠀⠀transform_skip_flag[ xC ][ yC ][ 1 ] | ae(v) |
| ⠀⠀⠀⠀if( !transform_skip_flag[ xC ][ yC ][ 1 ] \|\| sh_ts_residual_coding_disabled_flag ) | |
| ⠀⠀⠀⠀⠀residual_coding( xC, yC, Log2( wC ), Log2( hC ), 1 ) | |
| ⠀⠀⠀⠀else | |
| ⠀⠀⠀⠀⠀residual_ts_coding( xC, yC, Log2( wC ), Log2( hC ), 1 ) | |
| ⠀⠀⠀}⠀⠀ | |
| ⠀⠀⠀if( tu_cr_coded_flag[ xC ][ yC ] && treeType != DUAL_TREE_LUMA && | |
| ⠀⠀⠀⠀!( tu_cb_coded_flag[ xC ][ yC ] && tu_joint_cbcr_residual_flag[ xC ][ yC ] ) ) { | |
| ⠀⠀⠀⠀if( sps_transform_skip_enabled_flag && !BdpcmFlag[ x0 ][ y0 ][ 2 ] && | |
| ⠀⠀⠀⠀⠀⠀wC <= MaxTsSize && hC <= MaxTsSize && !cu_sbt_flag ) | |
| ⠀⠀⠀⠀⠀transform_skip_flag[ xC ][ yC ][ 2 ] | ae(v) |
| ⠀⠀⠀⠀if( !transform_skip_flag[ xC ][ yC ][ 2 ] \|\| sh_ts_residual_coding_disabled_flag ) | |
| ⠀⠀⠀⠀⠀residual_coding( xC, yC, Log2( wC ), Log2( hC ), 2 ) | |
| ⠀⠀⠀⠀else | |
| ⠀⠀⠀⠀⠀residual_ts_coding( xC, yC, Log2( wC ), Log2( hC ), 2 ) | |
| ⠀⠀⠀}⠀⠀ | |
| }⠀⠀⠀⠀ | |

TABLE 3

| | Descriptor |
|---|---|
| residual_coding( x0, y0, log2TbWidth, log2TbHeight, cIdx ) { | |
| ⠀if( sps_mts_enabled_flag && cu_sbt_flag && cIdx = = 0 && | |
| ⠀⠀⠀log2TbWidth = = 5 && log2TbHeight < 6 ) | |
| ⠀⠀log2ZoTbWidth = 4 | |
| ⠀else | |
| ⠀⠀log2ZoTbWidth = Min( log2TbWidth, 5 ) | |
| ⠀if( sps_mts_enabled_flag && cu_sbt_flag && cIdx = = 0 && | |
| ⠀⠀⠀log2TbWidth < 6 && log2TbHeight = = 5 ) | |
| ⠀⠀log2ZoTbHeight = 4 | |
| ⠀else | |
| ⠀⠀log2ZoTbHeight = Min( log2TbHeight, 5 ) | |
| ⠀if( log2TbWidth > 0 ) | |
| ⠀⠀last_sig_coeff_x_prefix | ae(v) |
| ⠀if( log2TbHeight > 0 ) | |
| ⠀⠀last_sig_coeff_y_prefix | ae(v) |
| ⠀if( last_sig_coeff_x_prefix > 3 ) | |
| ⠀⠀last_sig_coeff_x_suffix | ae(v) |
| ⠀if( last_sig_coeff_y_prefix > 3 ) | |
| ⠀⠀last_sig_coeff_y_suffix | ae(v) |
| ⠀log2TbWidth = log2ZoTbWidth | |
| ⠀log2TbHeight = log2ZoTbHeight | |
| ⠀remBinsPass1 = ( ( 1 << ( log2TbWidth + log2TbHeight ) ) * 7 ) >> 2 | |
| ⠀log2SbW = ( Min( log2TbWidth, log2TbHeight ) < 2 ? 1 : 2 ) | |
| ⠀log2SbH = log2SbW | |
| ⠀if( log2TbWidth + log2TbHeight > 3 ) | |

TABLE 3-continued

| | Descriptor |
|---|---|

```
    if( log2TbWidth < 2 ) {
        log2SbW = log2TbWidth
        log2SbH = 4 − log2SbW
    } else if( log2TbHeight < 2 ) {
        log2SbH = log2TbHeight
        log2SbW = 4 − log2SbH
    }
    numSbCoeff = 1 << ( log2SbW + log2SbH )
    lastScanPos = numSbCoeff
    lastSubBlock = ( 1 << ( log2TbWidth + log2TbHeight − ( log2SbW + log2Sb
H ) ) ) − 1
                do {
                    if( lastScanPos = = 0 ) {
                        lastScanPos = numSbCoeff
                        lastSubBlock− −
                    }
                    lastScanPos− −
                    xS = DiagScanOrder[ log2TbWidth − log2SbW ][ log2TbHeight − log2SbH ]
                            [ lastSubBlock ][ 0 ]
                    yS = DiagScanOrder[ log2TbWidth − log2SbW ][ log2TbHeight − log2SbH ]
                            [ lastSubBlock ][ 1 ]
                    xC = ( xS << log2SbW ) + DiagScanOrder[ log2SbW ][ log2SbH ][ lastScan
    Pos ][ 0 ]
                    yC = ( yS << log2SbH ) + DiagScanOrder[ log2SbW ][ log2SbH ][ lastScan
    Pos ][ 1 ]
                } while( ( xC != LastSignificantCoeffX ) | | ( yC != LastSignificantCoeffY )
    )
                if( lastSubBlock = = 0 && log2TbWidth >= 2 && log2TbHeight >= 2 &
    &
                    !transform_skip_flag[ x0 ][ y0 ][ cIdx ] && lastScanPos > 0 )
                    LfnstDcOnly = 0
                if( ( lastSubBlock > 0 && log2TbWidth >= 2 && log2TbHeight >= 2 ) | |
                    ( lastScanPos > 7 && ( log2TbWidth = = 2 | | log2TbWidth = = 3 ) &
    &
                        log2TbWidth = = log2TbHeight ) )
                    LfnstZeroOutSigCoeffFlag = 0
                if( ( lastSubBlock > 0 | | lastScanPos > 0 ) && cIdx = = 0 )
                    MtsDcOnly = 0
                QState = 0
                for( i = lastSubBlock; i >= 0; i− − ) {
                    startQStateSb = QState
                    xS = DiagScanOrder[ log2TbWidth − log2SbW ][ log2TbHeight − log2SbH ]
                            [ i ][ 0 ]
                    yS = DiagScanOrder[ log2TbWidth − log2SbW ][ log2TbHeight − log2SbH ]
                            [ i ][ 1 ]
                    inferSbDcSigCoeffFlag = 0
                    if( i < lastSubBlock && i > 0 ) {
```
| `                        sb_coded_flag[ xS ][ yS ]` | ae(v) |
```
                        inferSbDcSigCoeffFlag = 1
                    }
                    if( sb_coded_flag[ xS ][ yS ] && ( xS > 3 | | yS > 3 ) && cIdx = = 0 )
                        MtsZeroOutSigCoeffFlag = 0
                    firstSigScanPosSb = numSbCoeff
                    lastSigScanPosSb = −1
                    firstPosMode0 = ( i = = lastSubBlock ? lastScanPos : numSbCoeff − 1 )
                    firstPosMode1 = firstPosMode0
                    for( n = firstPosMode0; n >= 0 && remBinsPass1 >= 4; n− − ) {
                        xC = ( xS << log2SbW ) + DiagScanOrder[ log2SbW ][ log2SbH ][ n ]
    [ 0 ]
                        yC = ( yS << log2SbH) + DiagScanOrder[ log2SbW ][ log2SbH ][ n ]
    [ 1 ]
                        if( sb_coded_flag[ xS ][ yS ] && ( n > 0 | | !interSbDcSigCoeffFlag ) &
    &
                            ( xC != LastSignificantCoeffX | | yC != Last SignificantCoeffY ) )
                        {
```
| `                            sig_coeff_flag[ xC ][ yC ]` | ae(v) |
```
                            remBinsPass1− −
                            if( sig_coeff_flag[ xC ][ yC ] )
                                inferSbDcSigCoeffFlag = 0
                        }
                        if( sig_coeff_flag[ xC ][ yC ] ) {
```
| `                            abs_level_gtx_flag[ n ][ 0 ]` | ae(v) |
```
                            remBinsPass1− −
                            if( abs_level_gtx_flag[ n ][ 0 ] ) {
```
| `                                par_level_flag[ n ]` | ae(v) |
```
                                remBinsPass1− −
```
| `                                abs_level_gtx_flag[ n ][ 1 ]` | ae(v) |
```
                                remBinsPass1− −
```

TABLE 3-continued

|  | Descriptor |
|---|---|

```
            }
            if( lastSigScanPosSb = = −1 )
              lastSigScanPosSb = n
            firstSigScanPosSb = n
          }
          AbsLevelPass1[ xC ][ yC ] = sig_coeff_flag[ xC ][ yC ] + par_level_flag
[ n ] +
                    abs_level_gtx_flag[ n ][ 0 ] + 2 * abs_level_gtx flag[ n ]
[ 1 ]
          if( sh_dep_quant_used_flag )
            QState = QStateTransTable[ QState ][ AbsLevelPass1[ xC ][ yC ] & 1 ]
          firstPosMode1 = n − 1
        }
        for( n = firstPosMode0; n > firstPosMode1; n− − ) {
          xC = ( xS << log2SbW ) + DiagScanOrder[ log2SbW ][ log2SbH ][ n ]
[ 0 ]
          yC = ( yS << log2SbH ) + DiagScanOrder[ log2SbW ][ log2SbH ][ n ]
[ 1 ]
          if( abs_level_gtx_flag[ n ][ 1 ] )
            abs_remainder[ n ]                                                ae(v)
          AbsLevel[ xC ][ yC ] = AbsLevelPass1[ xC ][ yC ] +2 * abs_remainder[ n ]
        }
        for( n = firstPosMode1; n >= 0; n− − ) {
          xC = ( xS << log2SbW ) + DiagScanOrder[ log2SbW ][ log2SbH ][ n ]
[ 0 ]
          yC = ( yS << log2SbH ) + DiagScanOrder[ log2SbW ][ log2SbH ][ n ]
[ 1 ]
          if( sb_coded_flag[ xS ][ yS ] )
            dec_abs_level[ n ]                                                ae(v)
          if( AbsLevel[ xC ][ yC ] > 0 ) {
            if( lastSigScanPosSb = = −1 )
              lastSigScanPosSb = n
            firstSigScanPosSb = n
          }
          if( sh_dep_quant_used_flag )
            QState = QStateTransTable[ QState ][ AbsLevel[ xC ][ yC ] & 1 ]
        }
        if( sh_dep_quant_used_flag | | !sh_sign_data_hiding_used_flag )
          signHidden = 0
        else
          signHidden = ( lastSigScanPosSb − firstSigScanPosSb > 3 ? 1 : 0 )
        for( n = numSbCoeff − 1; n >= 0; n− − ) {
          xC = ( xS << log2SbW ) + DiagScanOrder[ log2SbW ][ log2SbH ][ n ]
[ 0 ]
          yC = ( yS << log2SbH ) + DiagScanOrder[ log2SbW ][ log2SbH ][ n ]
[ 1 ]
          if( ( AbsLevel[ xC ][ yC ] > 0 ) &&
              ( !signHidden | | ( n != firstSigScanPosSb ) ) )
            coeff_sign_flag[ n ]                                              ae(v)
        }
        if( sh_dep_quant_used_flag ) {
          QState = startQStateSb
          for( n = numSbCoeff − 1; n >= 0; n− − ) {
            xC = ( xS << log2SbW ) + DiagScanOrder[ log2SbW ][ log2SbH ][ n ]
[ 0 ]
            yC = ( yS << log2SbH ) + DiagScanOrder[ log2SbW ][ log2SbH ][ n ]
[ 1 ]
            if( AbsLevel[ xC ][ yC ] > 0 )
              TransCoeffLevel[ x0 ][ y0 ][ cIdx ][ xC ][ yC ] =
                  ( 2 * AbsLevel[ xC ][ yC ] − ( QState > 1 ? 1 : 0 ) ) *
                  ( 1 − 2 * coeff_sign_flag[ n ] )
            QState = QStateTransTable[ QState ][ AbsLevel[ xC ][ yC ] & 1 ]
        } else {
          sumAbsLevel = 0
          for( n = numSbCoeff − 1; n >= 0; n− − ) {
            xC = ( xS << log2SbW ) + DiagScanOrder[ log2SbW ][ log2SbH ][ n ]
[ 0 ]
            yC = ( yS << log2SbH ) + DiagScanOrder[ log2SbW ][ log2SbH ][ n ]
[ 1 ]
            if( AbsLevel[ xC ][ yC ] > 0 ) {
              TransCoeffLevel[ x0 ][ y0 ][ cIdx ][ xC ][ yC ] =
                  AbsLevel[ xC ][ yC ] * ( 1 − 2 * coeff_sign_flag[ n ] )
              if( signHidden ) {
                sumAbsLevel += AbsLevel[ xC ][ yC ]
                if( ( n = = firstSigScanPosSb ) && ( sumAbsLevel % 2 ) = = 1 )
)
                  TransCoeffLevel[ x0 ][ y0 ][ cIdx ][ xC ][ yC ] =
                    −TransCoeffLevel[ x0 ][ y0 ][ cIdx ][ xC ][ yC ]
```

TABLE 3-continued

| | Descriptor |
|---|---|
|           }<br>        }<br>      }<br>    }<br>  }<br>} | |

TABLE 4

| | Descriptor |
|---|---|
| residual_ts_coding( x0, y0, log2TbWidth, log2TbHeight, cIdx ) {<br>  log2SbW = ( Min( log2TbWidth, log2TbHeight ) < 2 ? 1 : 2 )<br>  log2SbH = log2SbW<br>  if( log2TbWidth + log2TbHeight > 3 )<br>    if( log2TbWidth < 2 ) {<br>      log2SbW = log2TbWidth<br>      log2SbH = 4 − log2SbW<br>    } else if( log2TbHeight < 2 ) {<br>      log2SbH = log2TbHeight<br>      log2SbW = 4 − log2SbH<br>    }<br>  numSbCoeff = 1 << ( log2SbW + log2SbH )<br>  lastSubBlock = ( 1 << ( log2TbWidth + log2TbHeight − ( log2SbW + log2Sb<br>H ) ) ) − 1<br>  inferSbCbf = 1<br>  RemCcbs = ( ( ( 1 << ( log2TbWidth + log2TbHeight ) ) * 7 ) >> 2<br>  for( i =0; i <= lastSubBlock; i++ ) {<br>    xS = DiagScanOrder[ log2TbWidth − log2SbW ][ log2TbHeight − log2SbH ]<br>[ i ][ 0 ]<br>    yS = DiagScanOrder[ log2TbWidth − log2SbW ][ log2TbHeight − log2SbH ]<br>[ i ][ 1 ]<br>    if( i != lastSubBlock \|\| !inferSbCbf )<br>      sb_coded_flag[ xS ][ yS ] | ae(v) |
|     if( sb_coded_flag[ xS ][ yS ] && i < lastSubBlock )<br>      inferSbCbf = 0<br>  /* First scan pass */<br>    inferSbSigCoeffFlag = 1<br>    lastScanPosPass1 = −1<br>    for( n = 0; n <= numSbCoeff − 1 && RemCcbs >= 4; n++ ) {<br>      xC = ( xS << log2SbW ) + DiagScanOrder[ log2SbW ][ log2SbH ][ n ]<br>[ 0 ]<br>      yC = ( yS << log2SbH ) + DiagScanOrder[ log2SbW ][ log2SbH ][ n ]<br>[ 1 ]<br>      lastScanPosPass1 = n<br>      if( sb_coded_flag[ xS ][ yS ] &&<br>        ( n != numSbCoeff − 1 \|\| !inferSbSigCoeffFlag ) ) {<br>        sig_coeff_flag[ xC ][ yC ] | ae(v) |
|         RemCcbs− −<br>        if( sig_coeff_flag[ xC ][ yC ] )<br>          inferSbSigCoeffFlag = 0<br>      }<br>      CoeffSignLevel[ xC ][ yC ] = 0<br>      if( sig_coeff_flag[ xC ][ yC ] ) {<br>        coeff_sign_flag[ n ] | ae(v) |
|         RemCcbs− −<br>        CoeffSignLevel[ xC ][ yC ] = ( coeff_sign_flag[ n ] > 0 ? −1 : 1 )<br>        abs_level_gtx_flag[ n ][ 0 ] | ae(v) |
|         RemCcbs− −<br>        if( abs_level_gtx_flag[ n ][ 0 ] ) {<br>          par_level_flag[ n ] | ae(v) |
|           RemCcbs− −<br>        }<br>      }<br>      AbsLevelPass1[ xC ][ yC ] =<br>        sig_coeff_flag[ xC ][ yC ] + par_level_flag[ n ] + abs_level_gtx_flag<br>[ n ][ 0 ]<br>    }<br>  /* Greater than X scan pass (numGtXFlags=5) */<br>    lastScanPosPass2 = −1<br>    for( n = 0; n <= numSbCoeff − 1 && RemCcbs >= 4; n++ ) {<br>      xC = ( xS << log2SbW ) + DiagScanOrder[ log2SbW ][ log2SbH ][ n ]<br>[ 0 ]<br>      yC = ( yS << log2SbH ) + DiagScanOrder[ log2SbW ][ log2SbH ][ n ]<br>[ 1 ] | |

TABLE 4-continued

| | Descriptor |
|---|---|
| <pre>      AbsLevelPass2[ xC ][ yC ] = AbsLevelPass1[ xC ][ yC ]
      for( j = 1; j < 5; j++ ) {
        if( abs_level_gtx_flag[ n ][ j - 1 ] ) {
          abs_level_gtx_flag[ n ][ j ]
          RemCcbs- -
        }
        AbsLevelPass2[ xC ][ yC ] += 2 * abs_level_gtx_flag[ n ][ j ]
      }
      lastScanPosPass2 = n
    }
    /* remainder scan pass */
    for( n = 0; n <= numSbCoeff - 1; n++ ) {
      xC = ( xS << log2SbW ) + DiagScanOrder[ log2SbW ][ log2SbH ][ n ]
      yC = ( yS << log2SbH ) + DiagScanOrder[ log2SbW ][ log2SbH ][ n ]
      if( ( n <= lastScanPosPass2 && AbsLevelPass2[ xC ][ yC ] >= 10 ) ||
          ( n > lastScanPosPass2 && n <= lastScanPosPass1 &&
          AbsLevelPass1[ xC ][ yC ] >= 2 ) ||
          ( n > lastScanPosPass1 && sb_coded_flag[ xS ][ yS ] ) )
        abs_remainder[ n ]
      if( n <= lastScanPosPass2 )
        AbsLevel[ xC ][ yC ] = AbsLevelPass2[ xC ][ yC ] + 2 * abs_remainder
                                                                      [ n ]
      else if(n <= lastScanPosPass1 )
        AbsLevel[ xC ][ yC ] = AbsLevelPass1[ xC ][ yC ] + 2 * abs_remainder
                                                                      [ n ]
      else { /* bypass */
        AbsLevel[ xC ][ yC ] = abs_remainder[ n ]
        if( abs_remainder[ n ] )
          coeff_sign_flag[ n ]
      }
      if( BdpcmFlag[ x0 ][ y0 ][ cIdx ] = = 0 && n <= lastScanPosPass1 ) {
        absLeftCoeff = xC > 0 ? AbsLevel[ xC - 1 ][ yC ] ) : 0
        absAboveCoeff = yC > 0 ? AbsLevel[ xC ][ yC - 1 ] ) : 0
        predCoeff = Max( absLeftCoeff, absAboveCoeff )
        if( AbsLevel[ xC ][ yC ] = = 1 && predCoeff > 0 )
          AbsLevel[ xC ][ yC ] = predCoeff
        else if( AbsLevel[ xC ][ yC ] > 0 && AbsLevel[ xC ][ yC ] <= predCo
eff )
          AbsLevel[ xC ][ yC ]- -
      }
      TransCoeffLevel[ x0 ][ y0 ][ cIdx ][ xC ][ yC ] = ( 1 - 2 * coeff_sign_flag
                                                                      [ n ] ) *
          AbsLevel[ xC ][ yC ]
    }
  }
}</pre> | ae(v)<br><br><br><br><br><br><br><br><br><br><br><br>ae(v)<br><br><br><br><br><br><br><br><br>ae(v) |

According to the present embodiment, as shown in Table 2, residual coding may be divided according to a value of the syntax element transform_skip_flag of the transform skip flag. That is, a different syntax element may be used for residual coding based on the value of the transform skip flag (based on whether the transform is skipped). Residual coding used when the transform skip is not applied (that is, when the transform is applied) may be called regular residual coding (RRC), and residual coding used when the transform skip is applied (that is, when the transform is not applied) may be called transform skip residual coding (TSRC). Also, the regular residual coding may be referred to as general residual coding. Also, the regular residual coding may be referred to as a regular residual coding syntax structure, and the transform skip residual coding may be referred to as a transform skip residual coding syntax structure. Table 3 above may show a syntax element of residual coding when a value of transform_skip_flag is 0, that is, when the transform is applied, and Table 4 above may show a syntax element of residual coding when the value of transform_skip_flag is 1, that is, when the transform is not applied.

Specifically, for example, the transform skip flag indicating whether to skip the transform of the transform block may be parsed, and whether the transform skip flag is 1 may be determined. If the value of the transform skip flag is 0, as shown in Table 3, syntax elements last_sig_coeff_x_prefix, last_sig_coeff_y_prefix, last_sig_coeff_x_suffix, last_sig_coeff_y_suffix, sb_coded_flag, sig_coeff_flag, abs_level_gtx_flag, par_level_flag, abs_remainder, coeff_sign_flag and/or dec_abs_level for a residual coefficient of the transform block may be parsed, and the residual coefficient may be derived based on the syntax elements. In this case, the syntax elements may be sequentially parsed, and a parsing order may be changed. In addition, the abs_level_gtx_flag may represent abs_level_gt1_flag, and/or abs_level_gt3_flag. For example, abs_level_gtx_flag[n][0] may be an example of a first transform coefficient level flag (abs_level_gt1_flag), and the abs_level_gtx_flag[n][1] may be an example of a second transform coefficient level flag (abs_level_gt3_flag).

Referring to the Table 3 above, last_sig_coeff_x_prefix, last_sig_coeffy_prefix, last_sig_coeff_x_suffix, last_sig_coeffy_suffix, sb_coded_flag, sig_coeff_flag, abs_level_gt1_flag, par_level_flag, abs_level_gt3_flag, abs_ remainder, coeff_sign_flag, and/or dec_abs_level may be encoded/decoded. Meanwhile, sb_coded_flag may be represented as coded_sub_block_flag.

In an embodiment, the encoding apparatus may encode (x, y) position information of the last non-zero transform coefficient in a transform block based on the syntax elements last_sig_coeff_x_prefix, last_sig_coeff_y_prefix, last_sig_coeff_x_suffix, and last_sig_coeff_y_suffix. More specifically, the last_sig_coeff_x_prefix represents a prefix of a column position of a last significant coefficient in a scanning order within the transform block, the last sig_coeff_y_prefix represents a prefix of a row position of the last significant coefficient in the scanning order within the transform block, the last_sig_coeff_x_suffix represents a suffix of a column position of the last significant coefficient in the scanning order within the transform block, and the last sig_coeff_y_suffix represents a suffix of a row position of the last significant coefficient in the scanning order within the transform block. Here, the significant coefficient may represent a non-zero coefficient. In addition, the scanning order may be a right diagonal scanning order. Alternatively, the scanning order may be a horizontal scanning order or a vertical scanning order. The scanning order may be determined based on whether intra/inter prediction is applied to a target block (a CB or a CB including a TB) and/or a specific intra/inter prediction mode.

Thereafter, the encoding apparatus may divide the transform block into 4×4 sub-blocks, and then indicate whether there is a non-zero coefficient in the current sub-block using a 1-bit syntax element coded_sub_block_flag for each 4×4 sub-block.

If a value of coded_sub_block_flag is 0, there is no more information to be transmitted, and thus, the encoding apparatus may terminate the encoding process on the current sub-block. Conversely, if the value of coded_sub_block_flag is 1, the encoding apparatus may continuously perform the encoding process on sig_coeff_flag. Since the sub-block including the last non-zero coefficient does not require encoding for the coded_sub_block_flag and the sub-block including the DC information of the transform block has a high probability of including the non-zero coefficient, coded_sub_block_flag may not be coded and a value thereof may be assumed as 1.

If the value of coded_sub_block_flag is 1 and thus it is determined that a non-zero coefficient exists in the current sub-block, the encoding apparatus may encode sig_coeff_flag having a binary value according to a reverse scanning order. The encoding apparatus may encode the 1-bit syntax element sig_coeff_flag for each transform coefficient according to the scanning order. If the value of the transform coefficient at the current scan position is not 0, the value of sig_coeff_flag may be 1. Here, in the case of a subblock including the last non-zero coefficient, sig_coeff_flag does not need to be encoded for the last non-zero coefficient, so the coding process for the sub-block may be omitted. Level information coding may be performed only when sig_coeff_flag is 1, and four syntax elements may be used in the level information encoding process. More specifically, each sig_coeff_flag[xC][yC] may indicate whether a level (value) of a corresponding transform coefficient at each transform coefficient position (xC, yC) in the current TB is non-zero. In an embodiment, the sig_coeff_flag may correspond to an example of a syntax element of a significant coefficient flag indicating whether a quantized transform coefficient is a non-zero significant coefficient.

A level value remaining after encoding for sig_coeff_flag may be derived as shown in the following equation. That is, the syntax element remAbsLevel indicating a level value to be encoded may be derived from the following equation.

$$\text{remAbsLevel} = |coeff| - 1 \qquad \text{[Equation 1]}$$

Herein, coeff means an actual transform coefficient value.

Additionally, abs_level_gt1_flag may indicate whether or not remAbsLevel' of the corresponding scanning position (n) is greater than 1. For example, when the value of abs_level_gt1_flag is 0, the absolute value of the transform coefficient of the corresponding position may be 1. In addition, when the value of the abs_level_gt1_flag is 1, the remAbsLevel indicating the level value to be encoded later may be updated as shown in the following equation.

$$\text{remAbsLevel} = \text{remAbsLevel} - 1 \qquad \text{[Equation 2]}$$

In addition, the least significant coefficient (LSB) value of remAbsLevel described in Equation 2 described above may be encoded as in Equation 3 below through par_level_flag.

$$\text{par\_level\_flag} = |coeff| \ \& \ 1 \qquad \text{[Equation 3]}$$

Herein, par_level_flag[n] may indicate a parity of a transform coefficient level (value) at a scanning position n.

A transform coefficient level value remAbsLevel that is to be encoded after performing par_level_flag encoding may be updated as shown below in the following equation.

$$remAbsLevel = remAbsLevel \gg 1 \qquad \text{[Equation 4]}$$

abs_level_gt3_flag may indicate whether or not remAbsLevel' of the corresponding scanning position (n) is greater than 3. Encoding for abs_remainder may be performed only in a case where rem_abs_gt3_flag is equal to 1. A relationship between the actual transform coefficient value coeff and each syntax element may be as shown below in the following equation.

$$|coeff| = \text{sig\_coeff\_flag} + \text{abs\_level\_gt1\_flag} + \qquad \text{[Equation 5]}$$
$$\text{par\_level\_flag} + 2*(\text{abs\_level\_gt3\_flag} + \text{abs\_remainder})$$

Additionally, the following table indicates examples related to the above-described Equation 5.

TABLE 5

| \|coeff[n]\| | sig_coeff_flag[n] | abs_level_gtX_flag[n][0] | par_level_flag[n] | abs_level_gtX_flag[n][1] | abs_remainder[n] |
|---|---|---|---|---|---|
| 0 | 0 | | | | |
| 1 | 1 | 0 | | | |
| 2 | 1 | 1 | 0 | 0 | |
| 3 | 1 | 1 | 1 | 0 | |
| 4 | 1 | 1 | 0 | 1 | 0 |
| 5 | 1 | 1 | 1 | 1 | 0 |
| 6 | 1 | 1 | 0 | 1 | 1 |
| 7 | 1 | 1 | 1 | 1 | 1 |
| 8 | 1 | 1 | 0 | 1 | 2 |
| 9 | 1 | 1 | 1 | 1 | 2 |
| 10 | 1 | 1 | 0 | 1 | 3 |
| 11 | 1 | 1 | 1 | 1 | 3 |
| ... | ... | ... | ... | | |

Herein, |coeff| indicates a transform coefficient level (value) and may also be indicates as an AbsLevel for a transform coefficient. Additionally, a sign of each coefficient may be encoded by using coeff_sign_flag, which is a 1-bit symbol.

Also, if the value of the transform skip flag is 1, as shown in Table 4, syntax elements sb_coded_flag, sig_coeff_flag, coeff_sign_flag, abs_level_gtx_flag, par_level_flag and/or abs_remainder for a residual coefficient of the transform block may be parsed, and the residual coefficient may be derived based on the syntax elements. In this case, the syntax elements may be sequentially parsed, and a parsing order may be changed. In addition, the abs_level_gtx_flag may represent abs_level_gt1_flag, abs_level_gt3_flag, abs_level_gt5_flag, abs_level_gt7_flag, and/or abs_level_gt9_flag. For example, abs_level_gtx_flag[n][j] may be a flag indicating whether an absolute value or a level (a value) of a transform coefficient at a scanning position n is greater than (j«1)+1. The condition (j«1)+1 may be optionally replaced with a specific threshold such as a first threshold, a second threshold, or the like.

Meanwhile, CABAC provides high performance, but disadvantageously has poor throughput performance. This is caused by a regular coding engine of the CABAC. Regular encoding (i.e., coding through the regular coding engine of the CABAC) shows high data dependence since it uses a probability state and range updated through coding of a previous bin, and it may take a lot of time to read a probability interval and determine a current state. The throughput problem of the CABAC may be solved by limiting the number of context-coded bins. For example, as shown in Table 1 or Table 3 described above, a sum of bins used to express sig_coeff_flag, abs_level_gt1_flag, par_level_flag, and abs_level_gt3_flag may be limited to the number of bins depending on a size of a corresponding block. Also, for example, as shown in Table 4 described above, a sum of bins used to express sig_coeff_flag, coeff_sign_flag, abs_level_gt1_flag, par_level_flag, abs_level_gt3_flag abs_level_gt5_flag, abs_level_gt7_flag, abs_level_gt9_flag may be limited to the number of bins depending on a size of a corresponding block. For example, if the corresponding block is a block of a 4×4 size, the sum of bins for the sig_coeff_flag, abs_level_gt1_flag, par_level_flag, abs_level_gt3_flag or sig_coeff_flag, coeff_sign_flag, abs_level_gt1_flag, par_level_flag, abs_level_gt3_flag abs_level_gt5_flag, abs_level_gt7_flag, abs_level_gt9_flag may be limited to 32 (or ex. 28), and if the corresponding block is a block of a 2×2 size, the sum of bins for the sig_coeff_flag, abs_level_gt1_flag, par_level_flag, abs_level_gt3_flag may be limited to 8 (or ex. 7). The limited number of bins may be represented by remBinsPass1 or RemCcbs. Or, for example, for higher CABAC throughput, the number of context coded bins may be limited for a block (CB or TB) including a coding target CG. In other words, the number of context coded bins may be limited in units of blocks (CB or TB). For example, when the size of the current block is 16×16, the number of context coded bins for the current block may be limited to 1.75 times the number of pixels of the current block, i.e., 448, regardless of the current CG.

In this case, if all context-coded bins of which the number is limited are used when a context element is coded, the encoding apparatus may binarize the remaining coefficients through a method of binarizing the coefficient as described below, instead of using the context coding, and may perform bypass encoding. In other words, for example, if the number of context-coded bins which are coded for 4×4 CG is 32 (or ex. 28), or if the number of context-coded bins which are coded for 2×2 CG is 8 (or ex. 7), sig_coeff_flag, abs_level_gt1_flag, par_level_flag, abs_level_gt3_flag which are coded with the context-coded bin may no longer be coded, and may be coded directly to dec_abs_level. Or, for example, when the number of context coded bins coded for a 4×4 block is 1.75 times the number of pixels of the entire block, that is, when limited to 28, the sig_coeff_flag, abs_level_gt1_flag, par_level_flag, and abs_level_gt3_flag coded as context coded bins may not be coded any more, and may be directly coded as dec_abs_level as shown in Table 6 below.

TABLE 6

| \|coeff[n]\| | dec_abs_level[n] |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| ... | ... |

A value |coeff| may be derived based on dec_abs_level. In this case, a transform coefficient value, i.e., |coeff|, may be derived as shown in the following equation.

$$|coeff| = dec\_abs\_level \qquad [\text{Equation 6}]$$

In addition, the coeff_sign_flag may indicate a sign of a transform coefficient level at a corresponding scanning position n. That is, the coeff_sign_flag may indicate the sign of the transform coefficient at the corresponding scanning position n.

Figure 8:
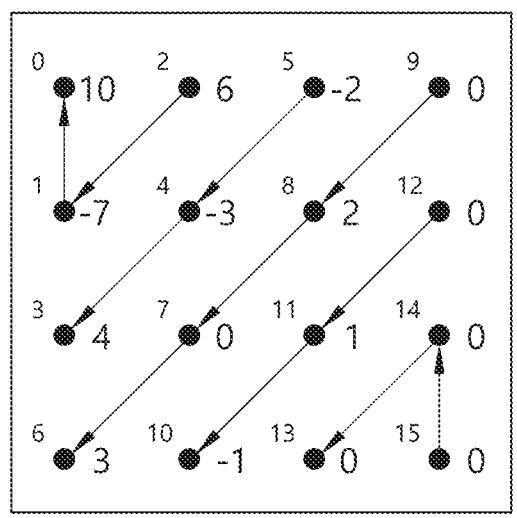
FIG. 8 is a diagram showing exemplary transform coefficients within a 4×4 block.

FIG. 8 shows an example of transform coefficients in a 4×4 block.

The 4×4 block of FIG. 8 represents an example of quantized coefficients. The block of FIG. 8 may be a 4×4 transform block, or a 4×4 sub-block of an 8×8, 16×16, 32×32, or 64×64 transform block. The 4×4 block of FIG. 8 may represent a luma block or a chroma block.

Meanwhile, as described above, when an input signal is not a binary value but a syntax element, the encoding apparatus may transform the input signal into a binary value by binarizing a value of the input signal. In addition, the decoding apparatus may decode the syntax element to derive a binarized value (e.g., a binarized bin) of the syntax element, and may de-binarize the binarized value to derive a value of the syntax element. The binarization process may be performed as a truncated rice (TR) binarization process, a k-th order Exp-Golomb (EGk) binarization process, a limited k-th order Exp-Golomb (limited EGk), a fixed-length (FL) binarization process, or the like. In addition, the de-binarization process may represent a process performed based on the TR binarization process, the EGk binarization process, or the FL binarization process to derive the value of the syntax element.

For example, the TR binarization process may be performed as follows.

An input of the TR binarization process may be cMax and cRiceParam for a syntax element and a request for TR binarization. In addition, an output of the TR binarization process may be TR binarization for symbolVal which is a value corresponding to a bin string.

Specifically, for example, in the presence of a suffix bin string for a syntax element, a TR bin string for the syntax element may be concatenation of a prefix bin string and the suffix bin string, and in the absence of the suffix bin string, the TR bin string for the syntax element may be the prefix bin string. For example, the prefix bin string may be derived as described below.

A prefix value of the symbolVal for the syntax element may be derived as shown in the following equation.

$$prefixVal = symbolVal \gg cRiceParam \qquad [\text{Equation 7}]$$

Herein, prefixVal may denote a prefix value of the symbolVal. A prefix (i.e., a prefix bin string) of the TR bin string of the syntax element may be derived as described below.

For example, if the prefixVal is less than cMax»cRiceParam, the prefix bin string may be a bit string of length prefixVal+1, indexed by binIdx. That is, if the prefixVal is less than cMax»cRiceParam, the prefix bin string may be a bit string of which the number of bits is prefixVal+1, indicated by binIdx. A bin for binIdx less than prefixVal may be equal to 1. In addition, a bin for the same binIdx as the prefixVal may be equal to 0.

For example, a bin string derived through unary binarization for the prefixVal may be as shown in the following table.

TABLE 7

| prefixVal | Bin string | | | | | |
|---|---|---|---|---|---|---|
| 0 | 0 | | | | | |
| 1 | 1 | 0 | | | | |
| 2 | 1 | 1 | 0 | | | |
| 3 | 1 | 1 | 1 | 0 | | |
| 4 | 1 | 1 | 1 | 1 | 0 | |
| 5 | 1 | 1 | 1 | 1 | 1 | 0 |
| ... | | | | | | |
| binIdx | 0 | 1 | 2 | 3 | 4 | 5 |

Meanwhile, if the prefixVal is not less than cMax»cRiceParam, the prefix bin string may be a bit string in which a length is cMax»cRiceParam and all bits are 1.

In addition, if cMax is greater than symbolVal and if cRiceParam is greater than 0, a bin suffix bin string of a TR bin string may be present. For example, the suffix bin string may be derived as described below.

A suffix value of the symbolVal for the syntax element may be derived as shown in the following equation.

$$suffixVal = symbolVal - ((prefixVal) \ll cRiceParam) \qquad [\text{Equation 8}]$$

Herein, suffixVal may denote a suffix value of the symbolVal.

A suffix of a TR bin string (i.e., a suffix bin string) may be derived based on an FL binarization process for suffixVal of which a value cMax is (1«cRiceParam)−1.

Meanwhile, if a value of an input parameter, i.e., cRiceParam, is 0, the TR binarization may be precisely truncated unary binarization, and may always use the same value cMax as a possible maximum value of a syntax element to be decoded.

In addition, for example, the EGk binarization process may be performed as follows. A syntax element coded with ue(v) may be a syntax element subjected to Exp-Golomb coding.

For example, a 0-th order Exp-Golomb (EG0) binarization process may be performed as follows.

A parsing process for the syntax element may begin with reading a bit including a first non-zero bit starting at a current position of a bitstream and counting the number of leading bits equal to 0. The process may be represented as shown in the following table.

TABLE 8

| leadingZeroBits = −1 |
| for( b = 0; !b; leadingZeroBits++ ) |
|   b = read_bits( 1 ) |

In addition, a variable 'codeNum' may be derived as shown in the following equation.

$$codeNum = 2^{leadingZeroBits} - 1 + \text{read\_bits}(leadingZeroBits) \qquad [\text{Equation 9}]$$

Herein, a value returned from read_bits(leadingZeroBits), that is, a value indicated by read_bits(leadingZeroBits), may be interpreted as binary representation of an unsigned integer for a most significant bit recorded first.

A structure of an Exp-Golomb code in which a bit string is divided into a "prefix" bit and a "suffix" bit may be represented as shown in the following table.

TABLE 9

| Bit string form | Range of codeNum |
| --- | --- |
| 1 | 0 |
| 0 1 $x_0$ | 1 ... 2 |
| 0 0 1 $x_1$ $x_0$ | 3 ... 6 |
| 0 0 0 1 $x_2$ $x_1$ $x_0$ | 7 ... 14 |
| 0 0 0 0 1 $x_3$ $x_2$ $x_1$ $x_0$ | 15 ... 30 |
| 0 0 0 0 0 1 $x_4$ $x_3$ $x_2$ $x_1$ $x_0$ | 31 ... 62 |
| ... | ... |

The "prefix" bit may be a bit parsed as described above to calculate leadingZeroBits, and may be represented by 0 or 1 of a bit string in Table 9. That is, the bit string disclosed by 0 or 1 in Table 9 above may represent a prefix bit string. The "suffix" bit may be a bit parsed in the computation of codeNum, and may be represented by xi in Table 9 above. That is, a bit string disclosed as xi in Table 9 above may represent a suffix bit string. Herein, i may be a value in the range of LeadingZeroBits−1. In addition, each xi may be equal to 0 or 1.

A bit string assigned to the codeNum may be as shown in the following table.

TABLE 10

| Bit string | codeNum |
| --- | --- |
| 1 | 0 |
| 0 1 0 | 1 |
| 0 1 1 | 2 |
| 0 0 1 0 0 | 3 |
| 0 0 1 0 1 | 4 |
| 0 0 1 1 0 | 5 |
| 0 0 1 1 1 | 6 |
| 0 0 0 1 0 0 0 | 7 |
| 0 0 0 1 0 0 1 | 8 |
| 0 0 0 1 0 1 0 | 9 |
| ... | ... |

If a descriptor of the syntax element is ue(v), that is, if the syntax element is coded with ue(v), a value of the syntax element may be equal to codeNum.

In addition, for example, the EGk binarization process may be performed as follows.

An input of the EGk binarization process may be a request for EGk binarization. In addition, the output of the EGk binarization process may be EGk binarization for symbolVal, i.e., a value corresponding to a bin string.

A bit string of the EGk binarization process for symbolVal may be derived as follows.

TABLE 11

```
absV = Abs( symbolVal )
stopLoop = 0
do
    if( absV >= ( 1 << k ) ) {
        put( 1 )
        absV = absV − ( 1 << k )
        k++
    } else {
        put( 0 )
        while( k− − )
            put( ( absV >> k ) & 1 )
        stopLoop = 1
    }
while( !stopLoop )
```

Referring to Table 11 above, a binary value X may be added to an end of a bin string through each call of put(X). Herein, X may be 0 or 1.

In addition, for example, the limited EGk binarization process may be performed as follows.

An input of the limited EGk binarization process may be a request for limited EGk binarization, a rice parameter riceParam, log2TransformRange as a variable representing a binary logarithm of a maximum value, and maxPreExtLen as a variable representing a maximum prefix extension length. In addition, an output of the limited EGk binarization process may be limited EGk binarization for symbolVal as a value corresponding to an empty string.

A bit string of the limited EGk binarization process for the symbolVal may be derived as follows.

TABLE 12

```
codeValue = symbolVal >> riceParam
PrefixExtensionLength = 0
while( ( PrefixExtensionLength < maxPrefixExtensionLength ) &&
       ( codeValue > ( ( 2 << PrefixExtensionLength ) − 2 ) ) ) {
    PrefixExtensionLength++
    put( 1 )
}
if( PrefixExtensionLength = = maxPrefixExtensionLength )
    escapeLength = log2TransformRange
else {
    escapeLength = PrefixExtensionLength + riceParam
    put( 0 )
}
symbolVal = symbolVal − ( ( ( 1 << PrefixExtensionLength ) − 1 ) <<
    riceParam )
while( ( escapeLength− − ) > 0 )
    put( ( symbolVal >> escapeLength ) & 1 )
```

In addition, for example, the FL binarization process may be performed as follows.

An input of the FL binarization process may be a request for FL binarization and cMax for the syntax element. In addition, an output of the FL binarization process may be FL binarization for symbolVal as a value corresponding to a bin string.

FL binarization may be configured by using a bit string of which the number of bits has a fixed length of symbolVal. Herein, the fixed-length bit may be an unsigned integer bit string. That is, a bit string for symbolVal as a symbol value may be derived through FL binarization, and a bit length (i.e., the number of bits) of the bit string may be a fixed length.

For example, the fixed length may be derived as shown in the following equation.

$$fixedLength = \text{Ceil}(\text{Log2}(c\text{Max} + 1)) \quad \text{[Equation 10]}$$

Indexing of bins for FL binarization may be a method using a value which increases orderly from a most significant bit to a least significant bit. For example, a bin index related to the most significant bit may be binIdx=0.

Meanwhile, for example, a binarization process for a syntax element abs_remainder in the residual information may be performed as follows.

An input of the binarization process for the abs_remainder may be a request for binarization of a syntax element abs_remainder[n], a colour component cIdx, and a luma position (x0, y0). The luma position (x0, y0) may indicate a top-left sample of a current luma transform block based on the top-left luma sample of a picture.

An output of the binarization process for the abs_remainder may be binarization of the abs_remainder (i.e., a binarized bin string of the abs_remainder). Available bin strings for the abs_remainder may be derived through the binarization process.

A rice parameter cRiceParam for the abs_remainder[n] may be derived through a rice parameter derivation process performed by inputting the color component cIdx and luma position (x0, y0), the current coefficient scan position (xC, yC), log2TbWidth, which is the binary logarithm of the width of the transform block, and log2TbHeight, which is the binary logarithm of the height of the transform block. A detailed description of the rice parameter derivation process will be described later.

In addition, for example, cMax for abs_remainder[n] to be currently coded may be derived based on the rice parameter cRiceParam. The cMax may be derived as shown in the following equation.

$$c\text{Max} = 6 \ll c\text{RiceParam} \qquad \text{[Equation 11]}$$

Meanwhile, binarization for the abs_remainder, that is, a bin string for the abs_remainder, may be concatenation of a prefix bin string and a suffix bin string in the presence of the suffix bin string. In addition, in the absence of the suffix bin string, the bin string for the abs_remainder may be the prefix bin string.

For example, the prefix bin string may be derived as described below.

A prefix value prefixVal of the abs_remainder[n] may be derived as shown in the following equation.

$$\text{prefixVal} = \text{Min}(c\text{Max}, \text{abs\_remainder}[n]) \qquad \text{[Equation 12]}$$

A prefix of the bin string (i.e., a prefix bin string) of the abs_remainder[n] may be derived through a TR binarization process for the prefixVal, in which the cMax and the cRiceParam are used as an input.

If the prefix bin string is identical to a bit string in which all bits are 1 and a bit length is 6, a suffix bin string of the bin string of the abs_remainder[n] may exist, and may be derived as described below.

The rice parameter deriving process for the dec_abs_level[n] may be as follows.

An input of the rice parameter deriving process may be a colour component index cIdx, a luma position (x0, y0), a current coefficient scan position (xC, yC), log2TbWidth as a binary logarithm of a width of a transform block, and log2TbHeight as a binary logarithm of a height of the transform block. The luma position (x0, y0) may indicate a top-left sample of a current luma transform block based on a top-left luma sample of a picture. In addition, an output of the rice parameter deriving process may be the rice parameter cRiceParam.

For example, a variable locSumAbs may be derived similarly to a pseudo code disclosed in the following table, based on an array AbsLevel[x][y] for a transform block having the given component index cIdx and the top-left luma position (x0, y0).

TABLE 13 locSumAbs = 0
if( xC < (1 << log2TbWidth) − 1 ) {
  locSumAbs += AbsLevel[ xC + 1 ][ yC ]
  if( xC < (1 << log2TbWidth) − 2 )
    locSumAbs += AbsLevel[ xC + 2 ][ yC ]
  if( yC < (1 << log2TbHeight) − 1 )
    locSumAbs += AbsLevel[ xC + 1 ][ yC + 1 ]    (1532)
}
if( yC < (1 << log2TbHeight) − 1 ) {
  locSumAbs += AbsLevel[ xC ][ yC + 1 ]
  if( yC < (1 << log2TbHeight) − 2 )
    locSumAbs += AbsLevel[ xC ][ yC + 2 ]
}
locSumAbs = Clip3( 0, 31, locSumAbs − baseLevel * 5 )

Then, based on the given variable locSumAbs, the rice parameter cRiceParam may be derived as shown in the following table.

TABLE 14

| locSumAbs | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| cRiceParam | 0 | 0 | 0 | 0 | 0 | 0 | 0 | 1 | 1 | 1 | 1 | 1 | 1 | 1 | 2 | 2 |
| locSumAbs | 16 | 17 | 18 | 19 | 20 | 21 | 22 | 23 | 24 | 25 | 26 | 27 | 28 | 29 | 30 | 31 |
| cRiceParam | 2 | 2 | 2 | 2 | 2 | 2 | 2 | 2 | 2 | 2 | 2 | 2 | 3 | 3 | 3 | 3 |

Also, for example, in the rice parameter derivation process for abs_remainder[n], the baseLevel may be set to 4.

Alternatively, for example, the rice parameter cRiceParam may be determined based on whether a transform skip is applied to a current block. That is, if a transform is not applied to a current TB including a current CG, in other words, if the transform skip is applied to the current TB including the current CG, the rice parameter cRiceParam may be derived to be 1.

Also, a suffix value suffixVal of the abs_remainder may be derived as shown in the following equation.

$$\text{suffixVal} = \text{abs\_remainder}[n] - c\text{Max} \qquad \text{[Equation 13]}$$

A suffix bin string of the bin string of the abs_remainder may be derived through a limited EGk binarization process for the suffixVal in which k is set to cRiceParam+1, riceParam is set to cRiceParam, and log2TransformRange is set to 15, and maxPreExtLen is set to 11.

Meanwhile, for example, a binarization process for a syntax element dec_abs_level in the residual information may be performed as follows.

An input of the binarization process for the dec_abs_level may be a request for binarization of a syntax element dec_abs_level[n], a colour component cIdx, a luma position (x0, y0), a current coefficient scan position (xC, yC), log2TbWidth as a binary logarithm of a width of a transform block, and log2TbHeight as a binary logarithm of a height of the transform block. The luma position (x0, y0) may indicate a top-left sample of a current luma transform block based on a top-left luma sample of a picture.

An output of the binarization process for the dec_abs_level may be binarization of the dec_abs_level (i.e., a binarized bin string of the dec_abs_level). Available bin strings for the dec_abs_level may be derived through the binarization process.

A rice parameter cRiceParam for dec_abs_level[n] may be derived through a rice parameter deriving process performed with an input of the colour component cIdx, the luma position (x0, y0), the current coefficient scan position (xC, yC), the log2TbWidth as the binary logarithm of the width of the transform block, and the log2TbHeight as the binary logarithm of the height of the transform block. The rice parameter deriving process will be described below in detail.

In addition, for example, cMax for the dec_abs_level[n] may be derived based on the rice parameter cRiceParam. The cMax may be derived as shown in the following table.

$$cMax = 6 \ll cRiceParam \quad \text{[Equation 14]}$$

Meanwhile, binarization for the dec_abs_level[n], that is, a bin string for the dec_abs_level[n], may be concatenation of a prefix bin string and a suffix bin string in the presence of the suffix bin string. In addition, in the absence of the suffix bin string, the bin string for the dec_abs_level[n] may be the prefix bin string.

For example, the prefix bin string may be derived as described below.

A prefix value prefixVal of the dec_abs_level[n] may be derived as shown in the following equation.

$$prefixVal = \text{Min}(cMax, dec\_abs\_level[n]) \quad \text{[Equation 15]}$$

A prefix of the bin string (i.e., a prefix bin string) of the dec_abs_level[n] may be derived through a TR binarization process for the prefixVal, in which the cMax and the cRiceParam are used as an input.

If the prefix bin string is identical to a bit string in which all bits are 1 and a bit length is 6, a suffix bin string of the bin string of the dec_abs_level[n] may exist, and may be derived as described below.

The rice parameter deriving process for the dec_abs_level[n] may be as follows.

An input of the rice parameter deriving process may be a colour component index cIdx, a luma position (x0, y0), a current coefficient scan position (xC, yC), log2TbWidth as a binary logarithm of a width of a transform block, and log2TbHeight as a binary logarithm of a height of the transform block. The luma position (x0, y0) may indicate a top-left sample of a current luma transform block based on a top-left luma sample of a picture. In addition, an output of the rice parameter deriving process may be the rice parameter cRiceParam.

For example, a variable locSumAbs may be derived similarly to a pseudo code disclosed in the following table, based on an array AbsLevel[x][y] for a transform block having the given component index cIdx and the top-left luma position (x0, y0).

TABLE 15

| locSumAbs = 0 |
| if( xC < (1 << log2TbWidth) − 1 ) { |
|   locSumAbs += AbsLevel[ xC + 1 ][ yC ] |
|   if( xC < (1 << log2TbWidth) − 2 ) |
|     locSumAbs += AbsLevel[ xC + 2 ][ yC ] |
|   if( yC < (1 << log2TbHeight) − 1 ) |
|     locSumAbs += AbsLevel[ xC + 1 ][ yC + 1 ]     (1532) |
| } |
| if( yC < (1 << log2TbHeight) − 1 ) { |
|   locSumAbs += AbsLevel[ xC ][ yC + 1 ] |
|   if( yC < (1 << log2TbHeight) − 2 ) |
|     locSumAbs += AbsLevel[ xC ][ yC + 2 ] |
| } |
| locSumAbs = Clip3( 0, 31, locSumAbs − baseLevel * 5 ) |

Then, based on the given variable locSumAbs, the rice parameter cRiceParam may be derived as shown in the following table.

TABLE 16

| locSumAbs | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| cRiceParam | 0 | 0 | 0 | 0 | 0 | 0 | 0 | 1 | 1 | 1 | 1 | 1 | 1 | 1 | 2 | 2 |
| locSumAbs | 16 | 17 | 18 | 19 | 20 | 21 | 22 | 23 | 24 | 25 | 26 | 27 | 28 | 29 | 30 | 31 |
| cRiceParam | 2 | 2 | 2 | 2 | 2 | 2 | 2 | 2 | 2 | 2 | 2 | 2 | 3 | 3 | 3 | 3 |

Also, for example, in the rice parameter derivation process for dec_abs_level[n], the baseLevel may be set to 0, and the ZeroPos[n] may be derived as follows.

$$ZeroPos[n] = (QState < 2\,?\,1:2) \ll cRiceParam \quad \text{[Equation 16]}$$

In addition, a suffix value suffixVal of the dec_abs_level[n] may be derived as shown in the following equation.

$$suffixVal = dec\_abs\_level[n] - cMax \quad \text{[Equation 17]}$$

A suffix bin string of the bin string of the dec_abs_level[n] may be derived through a limited EGk binarization process for the suffixVal in which k is set to cRiceParam+1, truncSuffixLen is set to 15, and maxPreExtLen is set to 11.

Meanwhile, the RRC and the TSRC may have the following differences.

For example, in the TSRC, the Rice parameter for the syntax element abs_remainder[ ] may be derived as 1. The rice parameter cRiceParam of the syntax element abs_remainder[ ] in the RRC may be derived based on the lastAbsRemainder and the lastRiceParam as described above, but the rice parameter cRiceParam of the syntax element abs_remainder[ ] in the TSRC may be derived as 1. That is, for example, when transform skip is applied to the current block (e.g., the current TB), the Rice parameter cRiceParam for abs_remainder[ ] of the TSRC for the current block may be derived as 1.

Also, for example, referring to Table 3 and Table 4, in the RRC, abs_level_gtx_flag[n][0] and/or abs_level_gtx_flag[n][1] may be signaled, but in the TSRC, abs_level_gtx_flag[n][0], abs_level_gtx_flag[n][1], abs_level_gtx_flag[n][2], abs_level_gtx_flag[n][3], and abs_level_gtx_flag[n][4] may be signaled. Here, the abs_level_gtx_flag[n][0] may be expressed as abs_level_gt1_flag or a first coefficient level flag, the abs_level_gtx_flag[n][1] may be expressed as abs_level_gt3_flag or a second coefficient level flag, the abs_level_gtx_flag[n][2] may be expressed as abs_level_gt5_flag or a third coefficient level flag, the abs_level_gtx_flag[n][3] may be expressed as abs_level_gt7_flag or a fourth coefficient level flag, and the abs_level_gtx_flag[n][4] may be expressed as abs_level_gt9_flag or a fifth coefficient level flag. Specifically, the first coefficient level flag may be a flag for whether a coefficient level is greater than a first threshold (for example, 1), the second coefficient level flag may be a flag for whether a coefficient level is greater than a second threshold (for example, 3), the third coefficient level flag may be a flag for whether a coefficient level is greater than a third threshold (for example, 5), the fourth coefficient level flag may be a flag for whether a coefficient level is greater than a fourth threshold (for example, 7), the fifth coefficient level flag may be a flag for whether a coefficient level is greater than a fifth threshold (for example, 9). As described above, in the TSRC, compared to the RRC, abs_level_gtx_flag[n][0], abs_level_gtx_flag[n][1], and abs_level_gtx_flag[n][2], abs_level_gtx_flag[n][3], abs_level_gtx_flag[n][4] may be further included.

Also, for example, in the RRC, the syntax element coeff_sign_flag may be bypass coded, but in the TSRC, the syntax element coeff_sign_flag may be bypass coded or context coded.

Meanwhile, the present disclosure proposes a method of applying a level mapping technique in a simplified residual data coding structure for a transform skip block. Here, the transform skip block may represent a block to which a transform is not applied. In addition, the level mapping technique may refer to a technique in which an absolute coefficient level, i.e., absCoeffLevel, is mapped to a modified level coded by a method based on a (quantized) left residual sample and a top residual sample of a current residual sample (i.e., a current residual coefficient) when block based quantized residual domain differential pulse-code modulation (BDPCM) is not applied to a current block (eg, CU). The simplified residual data coding structure may be used for one coding block or the entire transform block or some subblocks/coefficient groups (CG) under specific conditions such as lossless coding or near-lossless coding. Alternatively, in the proposed method, the number of context coded bins that may be used for residual (data) coding within one TU (Transform Unit, TU) may be limited to a specific threshold, and when all of the context coded bins that may be used for the residual coding of the TU are exhausted (that is, when the number of context coded bins for the residual coding of the TU is equal to the specific threshold), the simplified residual data coding structure may be used.

Figure 9:
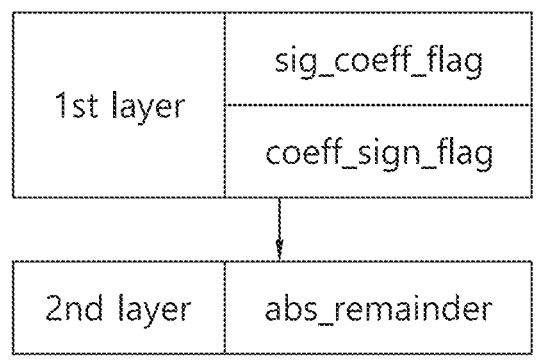
FIG. 9 illustrates an example of simplified residual data coding for one CG, transform block, or coding block.

FIG. 9 illustrates an example of simplified residual data coding for one CG, transform block, or coding block. With the simplified residual coding, syntax elements sig_coeff_flag, coeff_sign_flag, and abs_remainder may be coded. Syntax elements for residual coefficients in the CG, the transform block, or the coding block may be coded in the order from top to bottom as shown in FIG. 9. That is, the syntax elements for a residual coefficient in the CG, the transform block, or the coding block may be coded in the order of sig_coeff_flag, coeff_sign_flag, and abs_remainder.

The sig_coeff_flag may represent a syntax element for the significant coefficient flag. The sig_coeff_flag may represent whether a residual coefficient of a current block (CG, transform block, or coding block) is a non-zero residual coefficient. For example, the sig_coeff_flag may have a value of 0 if the value of the residual coefficient of the corresponding position is 0, and may have a value of 1 if not 0. Also, the coeff_sign_flag may represent a syntax element for a sign flag of the residual coefficient. The sig_coeff_flag may represent a sign of the residual coefficient. For example, the coeff_sign_flag may mean a sign value of a residual coefficient of a corresponding position. There may be various methods for applying the coeff_sign_flag. For example, when the residual coefficient of the corresponding position is 0, that is, when the value of sig_coeff_flag for the residual coefficient is 0, the coeff_sign_flag may not be coded. And, for non-zero residual coefficients, the coeff_sign_flag may have a value of 1 (or 0) when the residual coefficient of the corresponding position is a negative value, and the coeff_sign_flag may have a value of 0 (or 1) when the residual coefficient of the corresponding position is a positive value. Alternatively, regardless of the value of sig_coeff_flag of the residual coefficient, when the residual coefficient is a negative value, the coeff_sign_flag may have a value of 1 (or 0), and when the residual coefficient is a positive value or 0, the coeff_sign_flag may have a value of 0 (or 1). Alternatively, when the residual coefficient is a positive value, the coeff_sign_flag may have a value of 1 (or 0), and when the residual coefficient is a negative value or 0, the coeff_sign_ flag may have a value of 0 (or 1). Also, the abs_remainder may represent a syntax element for residual level value information or coefficient value related information. For example, the abs_remainder may mean a residual level value. For example, when the value of sig_coeff_flag for the residual coefficient is 0, the abs_remainder for the residual coefficient may not be coded, when the value of sig_coeff_flag for the residual coefficient is 1, the abs_remainder may have a value obtained by subtracting 1 from the absolute value of the residual coefficient (absolute value − 1).

Meanwhile, even when the regular residual coding is performed, if a specific condition is satisfied, it may be converted into the simplified residual data coding shown in FIG. 9. For example, the specific condition may be a case in which all of the context coded bins that can be used are exhausted when the residual information of the corresponding coding block is lossless or near lossless coded and/or when a TU level context coded bin constraint algorithm is applied.

Figure 10:
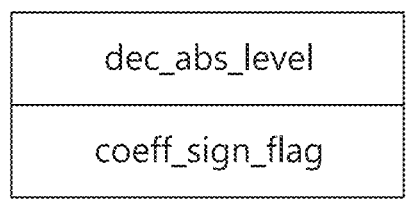
FIG. 10 illustrates another example of simplified residual data coding for one CG, transform block, or coding block.

FIG. 10 illustrates another example of simplified residual data coding for one CG, transform block, or coding block. With the simplified residual coding, syntax elements dec_abs_level, coeff_sign_flag may be coded. Syntax elements for residual coefficients in the CG, the transform block, or the coding block may be coded in the order from top to bottom as shown in FIG. 10. That is, the syntax elements for a residual coefficient in the CG, the transform block, or the coding block may be coded in the order of dec_abs_level, coeff_sign_flag.

Referring to FIG. 10, the dec_abs_level may represent a syntax element for coefficient value related information, and the coeff_sign_flag may represent a syntax element for a sign flag of the residual coefficient. For example, according to the structure shown in FIG. 10, when the residual coefficient is 0, a value of the dec_abs_level may be 0, and when the residual coefficient is not 0, the value of the dec_abs_level may be an absolute value of the residual coefficient. Also, for example, the coeff_sign_flag may mean a sign value of a residual coefficient of a corresponding position. There may be various methods for applying the coeff_sign_flag. For example, when the residual coefficient of the corresponding position is 0, the coeff_sign_flag may not be coded. And, for non-zero residual coefficients, the coeff_sign_flag may have a value of 1 (or 0) when the residual coefficient of the corresponding position is a negative value, and the coeff_sign_flag may have a value of 0 (or 1) when the residual coefficient of the corresponding position is a positive value. Alternatively, the coeff_sign_flag may be coded regardless of dec_abs_level of the residual coefficient, when the residual coefficient is a negative value, the coeff_sign_flag may have a value of 1 (or 0), and when the residual coefficient is a positive value or 0, the coeff_sign_flag may have a value of 0 (or 1). Alternatively, when the residual coefficient is a positive value, the coeff_sign_flag may have a value of 1 (or 0), and when the residual coefficient is a negative value or 0, the coeff_sign_flag may have a value of 0 (or 1).

Meanwhile, even when the regular residual coding is performed, if a specific condition is satisfied, it may be converted into the simplified residual data coding shown in FIG. 10. For example, the specific condition may be a case in which all of the context coded bins that can be used are exhausted when the residual information of the corresponding coding block is lossless or near lossless coded and/or when a TU level context coded bin constraint algorithm is applied.

Figure 11:
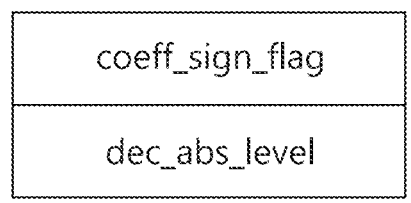
FIG. 11 illustrates another example of simplified residual data coding for one CG, transform block, or coding block.

FIG. 11 illustrates another example of simplified residual data coding for one CG, transform block, or coding block. With the simplified residual coding, syntax elements coeff_sign_flag, dec_abs_level may be coded. Syntax elements for residual coefficients in the CG, the transform block, or the coding block may be coded in the order from top to bottom as shown in FIG. 11. That is, the syntax elements for a residual coefficient in the CG, the transform block, or the coding block may be coded in the order of coeff_sign_flag, dec_abs_level.

Referring to FIG. 11, the the coeff_sign_flag may represent a syntax element for a sign flag of the residual coefficient, and the dec_abs_level may represent a syntax element for coefficient value related information. For example, when the residual coefficient of the position to be coded is a negative value, the coeff_sign_flag may have a value of 1 (or 0), and when the residual coefficient is a positive value or 0, the coeff_sign_flag may have a value of 0 (or 1). Alternatively, for example, when the residual coefficient is a positive value, the coeff_sign_flag may have a value of 1 (or 0), and when the residual coefficient is a negative value or 0, the coeff_sign_flag may have a value of 0 (or 1).

Meanwhile, even when the regular residual coding is performed, if a specific condition is satisfied, it may be converted into the simplified residual data coding shown in FIG. 11. For example, the specific condition may be a case in which all of the context coded bins that can be used are exhausted when the residual information of the corresponding coding block is lossless or near lossless coded and/or when a TU level context coded bin constraint algorithm is applied.

Meanwhile, as described above, the level mapping technique for the transform skip mode may be used. For example, in the level mapping technique, a value of abs_level_gtx_flag[0] may be used as a value representing whether level mapping is performed. That is, whether to map the level may be determined based on the value of the abs_level_gtx_flag[0]. Accordingly, in the simplified residual data coding structure in which abs_level_gtx_flag[0] is not coded, decoding of residual coefficients to which level mapping is applied cannot be properly performed. Accordingly, the present disclosure proposes a method not to use level mapping for a coding block, a transform block, a coefficient group, and/or a residual coefficient to which simplified residual data coding is applied so that the simplified residual data coding structure of FIG. 9, FIG. 10 or FIG. 11 and level mapping can be used together. According to an embodiment of the present disclosure, the simplified residual data coding structure and level mapping canbe combinedwithout problems in residual coding for a transform skip block.

For example, in one coding block, the residual data coding method for the transform skip block shown in Table 4 and the simplified residual data coding method may be mixed, when the residual data coding for the transform skip block is applied, the level mapping technique shown inTable 4 may be applied as itis, andwhenthe simplified residual data coding is applied, the level mapping technique may be applied.

Table 17 and Table 18 to be described below exemplarily show syntax to which an embodiment proposed in the present disclosure is applied.

TABLE 17

| | Descriptor |
|---|---|
| residual_ts_coding( x0, y0, log2TbWidth, log2TbHeight, cIdx ) {<br>...<br>    if( intra_bdpcm_flag = = 0 \| \| (MaxCcbs > 0) \| \| ((MaxCcbs <= 0) && abs_level_gtx_flag[n][0])){<br>        absRightCoeff = abs( TransCoeffLevel[ x0 ][ y0 ][ cIdx ][ xC − 1 ][ yC ] )<br>        absBelowCoeff = abs( TransCoeffLevel[ x0 ][ y0 ][ cIdx ][ xC ][ yC − 1 ] )<br>        predCoeff = Max( absRightCoeff, absBelowCoeff )<br>        if( AbsLevelPassX[ xC ][ yC ] + abs_remainder[ n ] = = 1 && predCoeff > 0 )<br>            TransCoeffLevel[ x0 ][ y0 ][ cIdx ][ xC ][ yC ] =<br>              ( 1 − 2 * coeff_sign_flag[ n ] ) * predCoeff<br>        else if( AbsLevelPassX[ xC ][ yC ] + abs_remainder[ n ] <= predCoeff )<br>            TransCoeffLevel[ x0 ][ y0 ][ cIdx ][ xC ][ yC ] = ( 1 − 2 * coeff_sign_flag[ n ] ) * |

TABLE 17-continued

| | Descriptor |
|---|---|
| ( AbsLevelPassX[ xC ][ yC ] + abs_remainder[ n ] − 1) <br>      else <br>        TransCoeffLevel[ x0 ][ y0 ][ cIdx ][ xC ][ yC ] = ( 1 − 2 * coeff_sign_flag[ n ] ) * <br>          ( AbsLevelPassX[ xC ][ yC ] + abs_remainder[ n ] ) <br>    } else <br>      TransCoeffLevel[ x0 ][ y0 ][ cIdx ][ xC ][ yC ] = ( 1 − 2 * coeff_sign_flag[ n ] ) * <br>        ( AbsLevelPassX[ xC ][ yC ] + abs_remainder[ n ] ) <br>  } <br> } <br>} | |

TABLE 18

| | Descriptor |
|---|---|
| residual_ts_coding( x0, y0, log2TbWidth, log2TbHeight, cIdx ) { <br>... <br>    if( intra_bdpcm_flag = = 0 \|\| tranquant_bypass_flag == 0){ <br>      absRightCoeff = abs( TransCoeffLevel[ x0 ][ y0 ][ cIdx ][ xC − 1 ][ yC ] ) <br>      absBelowCoeff = abs( TransCoeffLevel[ x0 ][ y0 ][ cIdx ][ xC ][ yC − 1 ] ) <br>      predCoeff = Max( absRightCoeff, absBelowCoeff ) <br>      if( AbsLevelPassX[ xC ][ yC ] + abs_remainder[ n ] = = 1 && predCoeff > 0 ) <br>        TransCoeffLevel[ x0 ][ y0 ][ cIdx ][ xC ][ yC ] = <br>          ( 1 − 2 * coeff_sign_flag[ n ] ) * predCoeff <br>      else if( AbsLevelPassX[ xC ][ yC ] + abs_remainder[ n ] <= predCoeff ) <br>        TransCoeffLevel[ x0 ][ y0 ][ cIdx ][ xC ][ yC ] = ( 1 − 2 * coeff_sign_flag[ n ] ) * <br>          ( AbsLevelPassX[ xC ][ yC ] + abs_remainder[ n ] − 1) <br>      else <br>        TransCoeffLevel[ x0 ][ y0 ][ cIdx ][ xC ][ yC ] = ( 1 − 2 * coeff_sign_flag[ n ] ) * <br>          ( AbsLevelPassX[ xC ][ yC ] + abs_remainder[ n ] ) <br>    } else <br>      TransCoeffLevel[ x0 ][ y0 ][ cIdx ][ xC ][ yC ] = ( 1 − 2 * coeff_sign_flag[ n ] ) * <br>        ( AbsLevelPassX[ xC ][ yC ] + abs_remainder[ n ] ) <br>  } <br> } <br>} | |

Table 17 may represent a syntax structure that prevents level mapping from being performed when the context coded bin constraint algorithm is applied, the available context coded bins (MaxCcbs represents the number of context coded bins that can be used) are exhausted and converted into the simplified residual data coding structure. In addition, Table 18 may represent a syntax structure to which the method proposed in the present disclosure is applied when a simplified residual data coding structure is used for a lossless coding block. Here, for example, transquant_bypass_flag shown in Table 18 may be a syntax element representing whether lossless coding is applied. The transquant_bypass_flag may be signaled at the CU or TU or picture level.

Meanwhile, Table 17 and Table 18 are only examples to which an embodiment proposed in the present disclosure is applied, and are not limited thereto. In the present disclosure, as an embodiment, when the simplified residual data coding structure is performed, in order to encode/decode the level-mapped residual coefficient, it is proposed that a process of correcting the encoded/decoded level is not performed. That is, for example, a method of deriving the residual coefficients of the current block using a simplified residual data coding structure without deriving the residual coefficients through level mapping when all the context coded bins for the current block are used may be proposed. The simplified residual data coding structure may be as described above. For example, when all of the context coded bins for the current block are used, the residual coefficient may be derived based on a value of information representing an absolute value and sign information. Also, for example, Table 4 may represent an example to which the embodiment proposed in the present disclosure is applied.

Figure 12:
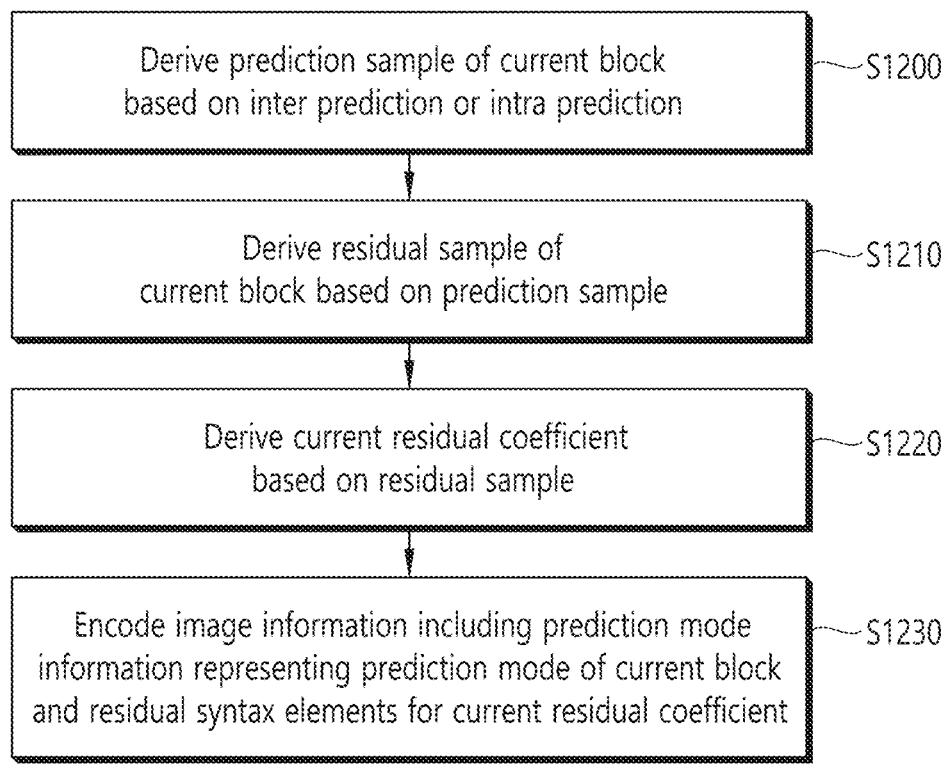
FIG. 12 briefly illustrates an image encoding method performed by an encoding apparatus according to the present disclosure.

FIG. 12 briefly illustrates an image encoding method performed by an encoding apparatus according to the present disclosure. The method disclosed in FIG. 12 may be performed by the encoding apparatus disclosed in FIG. 2. Specifically, for example, S1200 of FIG. 12 may be performed by a predictor of the encoding apparatus; S1210 to S1220 of FIG. 12 may be performed by a residual processor of the encoding apparatus; and S1230 may be performed by an entropy encoder of the encoding apparatus. Also, although not shown, a process of generating a reconstructed picture and a reconstructed sample for the current block based on a predicted sample and a residual sample for the current block may be performed by an adder of the encoding apparatus.

The encoding apparatus derives a prediction sample of a current block based on inter prediction or intra prediction (S1200). The encoding apparatus may derive prediction samples of the current block based on the prediction mode. In this case, various prediction methods disclosed in this document, such as inter prediction or intra prediction, may be applied.

For example, the encoding apparatus may determine whether to perform inter prediction or intra prediction on a current block, and may determine specific inter prediction mode or specific intra prediction mode based on RD cost. According to the determined mode, the encoding apparatus may derive the prediction sample for the current block.

The encoding apparatus derives a residual sample of the current block based on the prediction sample (S1210). For example, the encoding apparatus may derive the residual sample through the subtraction of the original sample and the prediction sample for the current block.

The encoding apparatus derives a current residual coefficient based on the residual sample (S1220). For example, the encoding apparatus may derive a current residual coefficient of the current block based on the residual sample. For example, the encoding apparatus may determine whether transform is applied to the current block. That is, the encoding apparatus may determine whether transform is applied to the residual sample of the current block. The encoding apparatus may determine whether or not to apply the transform to the current block in consideration of coding efficiency. For example, the encoding apparatus may determine that transform is not applied to the current block. A block to which the transform is not applied may be referred to as a transform skip block. That is, for example, the current block may be a transform skip block.

If the transform is not applied to the current block, that is, if the transform is not applied to the residual sample, the encoding apparatus may derive the derived residual sample as the current residual coefficient. In addition, if the transform is applied to the current block, that is, if the transform is applied to the residual sample, the encoding apparatus may derive the current residual coefficient by performing the transform on the residual sample. The current residual coefficient may be included in a current sub-block of the current block. The current sub-block may be called a current coefficient group (CG). In addition, the size of the current sub-block of the current block may be a 4×4 size or a 2×2 size. That is, the current sub-block of the current block may include up to 16 non-zero residual coefficients or up to 4 non-zero residual coefficients.

Here, the current block may be a coding block (CB) or a transform block (TB). Also, the residual coefficient may be referred to as a transform coefficient.

Meanwhile, for example, the current residual coefficient may be derived without performing level mapping. For example, a number of context-coded residual syntax elements for residual coefficients prior to the current residual coefficient among residual coefficients of the current block may be equal to a maximum number of context coded bins of the current block, and the residual syntax elements for the current residual coefficient may include absolute level information for the current residual coefficient and a sign flag of the residual coefficient, and the current residual coefficient may be derived without performing level mapping. Here, deriving the current residual coefficient using only the absolute level information and the sign flag may be represented as simplified residual data coding. That is, the residual coefficients may be derived based on simplified residual data coding. Additionally, for example, context coded bins for the current block may be all used as bins of context-coded residual syntax elements for residual coefficients prior to the current residual coefficient among residual coefficients of the current block, and the residual syntax elements for the current residual coefficient may include coefficient level information for the current residual coefficient and a sign flag of the residual coefficient, and the current residual coefficient may be derived without performing level mapping. For example, when all of the maximum number of context coded bins for the current block are used for residual syntax elements for previous residual coefficients of the current residual coefficient in the scanning order, and the residual syntax elements for the current residual coefficient may include coefficient level information for the current residual coefficient and a sign flag of the residual coefficient, and the current residual coefficient may be derived without performing level mapping. Also, for example, the residual coefficients prior to the current residual coefficient may be derived by performing the level mapping.

Meanwhile, for example, the level mapping may represent a method shown in Table 19.

TABLE 19

```
pred = max(X0, X1);
    if (absCoeff = = pred)
    {
        absCoeffMod = 1;
    }
    else
    {
        absCoeffMod = (absCoeff < pred) ? absCoeff + 1 : absCoeff;
    }
```

Here, $X_0$ may represent a left absolute coefficient level of the current residual coefficient (that is, a coefficient level of the left residual sample (left residual coefficient)), $X_1$ may represent a top absolute coefficient level of the current residual coefficient (that is, a coefficient level of the top residual sample (top residual coefficient)). Also, absCoeff may represent the absolute level coefficient of the current residual coefficient, and absCoeffMod may represent the level mapped level through the above-described process.

For example, the level mapping may mean a process of deriving a minimum value among an absolute level of the left residual coefficient of a residual coefficient and an absolute level of the top residual coefficient of the residual coefficient, modifying an absolute level of the residual coefficient based on the minimum value by comparing the minimum value and the absolute level of the residual coefficient.

The encoding apparatus encodes image information including prediction mode information representing a prediction mode of the current block and residual syntax elements for the current residual coefficient (S1230). The encoding apparatus may encode image information including prediction mode information representing a prediction mode of the current block and residual syntax elements for the current residual coefficient. For example, the encoding apparatus may generate and encode prediction related information for the current block. The prediction related information may include the prediction mode information. Additionally, the encoding apparatus may encode residual information including residual syntax elements for the current residual coefficient of the current block. The image information may include the residual information. For example, the encoding apparatus may encode image information including the residual information, and output the encoded image information in the form of a bitstream. The bitstream may be transmitted to the decoding apparatus through a network or a storage medium.

Also, for example, a number of context-coded residual syntax elements for residual coefficients prior to the current residual coefficient among residual coefficients of the current block may be equal to a maximum number of context coded bins of the current block. That is, for example, the context coded bins for the current block may be all used as bins of context-coded residual syntax elements for residual coefficients prior to the current residual coefficient among residual coefficients of the current block. In other words, for example, all of the maximum number of context coded bins for the current block may be used for residual syntax elements for previous residual coefficients of the current residual coefficient in the scanning order. Meanwhile, for example, the maximum number of context coded bins of the current block may be derived based on a width and a height of the current block.

For example, a number of context-coded residual syntax elements for residual coefficients prior to the current residual coefficient among residual coefficients of the current block may be equal to a maximum number of context coded bins of the current block, residual syntax elements for the current residual coefficient may include absolute level information for the current residual coefficient and a sign flag of the current residual coefficient. For example, the context coded bins for the current block may be all used as bins of context-coded residual syntax elements for residual coefficients prior to the current residual coefficient among residual coefficients of the current block, residual syntax elements for the current residual coefficient may include coefficient level information for the current residual coefficient and a sign flag of the current residual coefficient. For example, when all of the maximum number of context coded bins for the current block are used for residual syntax elements for previous residual coefficients of the current residual coefficient in the scanning order, residual syntax elements for the current residual coefficient may include coefficient level information for the current residual coefficient and a sign flag of the current residual coefficient. The residual syntax elements for the current residual coefficient be encoded based on bypass. That is, the residual syntax elements for the current residual coefficient may be encoded based on a uniform probability distribution. For example, the coefficient level information may represent an absolute value of the coefficient level of the current residual coefficient. Also, the sign flag may represent a sign of the current residual coefficient. For example, when a value of the sign flag is 0, the sign flag may represent that the coefficient level of the current residual coefficient is a positive value, when the value of the sign flag is 1, the sign flag may represent that the coefficient level of the current residual coefficient is a negative value. The coefficient level information may be the abs_remainder, and the sign flag may be the coeff_sign_flag.

Also, for example, the residual information may include a transform skip flag for the current block. The transform skip flag may represent whether transform is applied to the current block. That is, the transform skip flag may represent whether transform is applied to the residual coefficients of the current block. The syntax element representing the transform skip flag may be the transform_skip_flag. For example, when a value of the transform skip flag is 0, the transform skip flag may represent that transform is not applied to the current block, when a value of the transform skip flag is 1, the transform skip flag may represent that transform is applied to the current block. For example, when the current block is a transform skip block, the value of the transform skip flag for the current block may be 1.

Also, for example, the encoding apparatus may generate the residual information of the current block based on residual samples of the current block. For example, the image information may include the residual information for the current block. For example, the residual information may include residual syntax elements for a residual coefficient before the current residual coefficient in a scanning order. For example, the residual syntax elements may include syntax elements such as coded_sub_block_flag, sig_coeff_flag, coeff_sign_flag, abs_level_gt1_flag, par_level_flag, abs_level_gtX_flag, abs_remainder and/or coeff_sign_flag.

For example, the context-coded residual syntax elements may include a significant coefficient flag representing whether the residual coefficient is a non-zero residual coefficient, a parity level flag for a parity of the coefficient level for the residual coefficient, a sign flag representing a sign for the residual coefficient, a first coefficient level flag for whether the coefficient level is greater than a first threshold and/or a second coefficient level flag for whether the coefficient level is greater than a second threshold. Also, for example, the context-coded residual syntax elements may include a third coefficient level flag for whether the coefficient level is greater than a third threshold, a fourth coefficient level flag for whether the coefficient level of the residual coefficient is greater than a fourth threshold and/or a fifth coefficient level flag for whether the coefficient level of the residual coefficient is greater than a fifth threshold. Here, the significant coefficient flag may be sig_coeff_flag, the parity level flag may be par_level_flag, the sign flag may be coeff_sign_flag, the first coefficient level flag may be abs_level_gt1_flag, the second coefficient level flag may be abs_level_gt3_flag or abs_level_gtx_flag. Also, the third coefficient level flag may be abs_level_gt5_flag or abs_level_gtx_flag, the fourth coefficient level flag may be abs_level_gt7_flag or abs_level_gtx_flag, the fifth coefficient level flag may be abs_level_gt9_flag or abs_level_gtx_flag.

Also, for example, the residual information may include a bypass based coded syntax element for a residual coefficient of the current block. The bypass coded syntax element may include coefficient level information on a value of the current residual coefficient. The coefficient level information may be abs_remainder or dec_abs_level. Also, the bypass coded syntax element may include the sign flag.

Also, for example, the encoding apparatus may generate prediction information for the current block. The image information may include the prediction information for the current block. The prediction information may include information for an inter prediction mode or an intra prediction mode performed on the current block. The decoding apparatus may perform inter prediction or intra prediction on the current block based on the prediction information received through the bitstream, and may derive prediction samples of the current block.

Meanwhile, the bitstream may be transmitted to the decoding apparatus through over a network or a (digital) storage medium. Here, the network may include a broadcasting network and/or a communication network, and the digital storage medium may include various storage media such as USB, SD, CD, DVD, Blu-ray, HDD, SSD, and the like.

Figure 13:
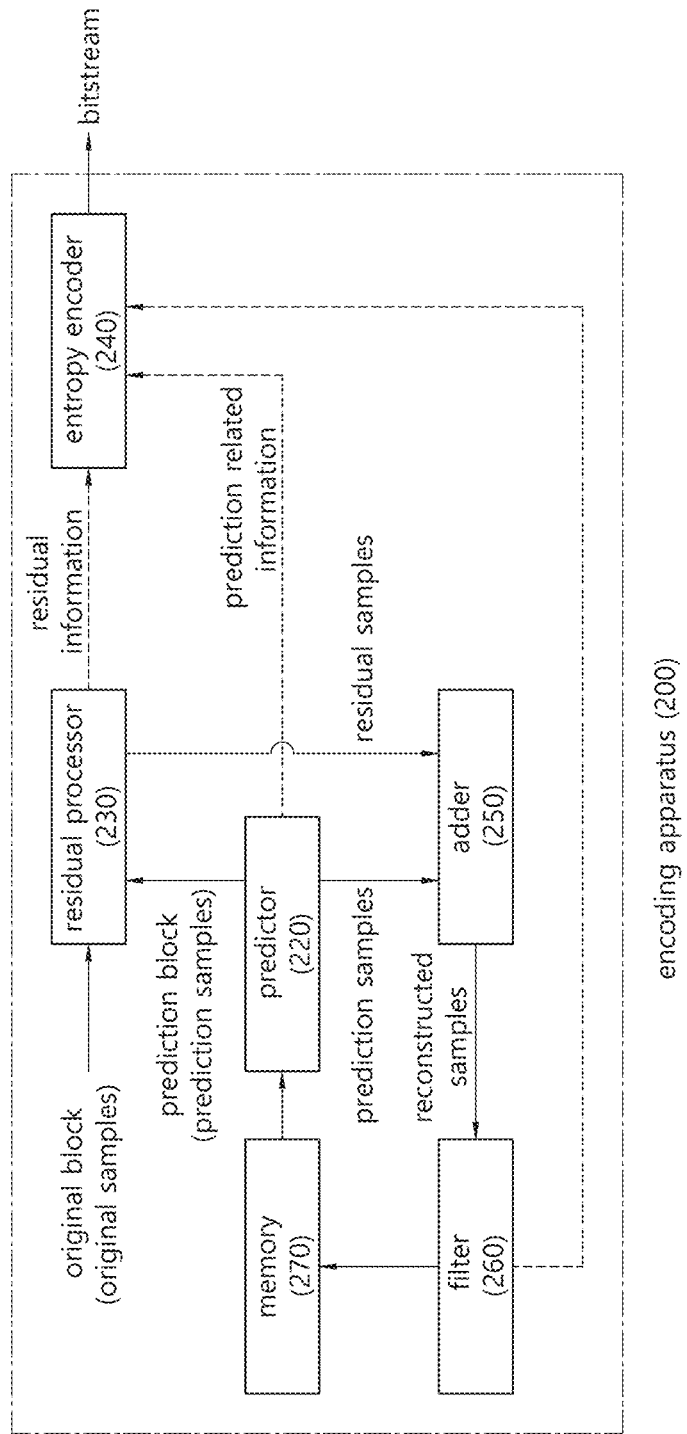
FIG. 13 briefly illustrates an encoding apparatus for performing an image encoding method according to the present disclosure.

FIG. 13 briefly illustrates an encoding apparatus for performing an image encoding method according to the present disclosure. The method disclosed in FIG. 12 may be performed by the encoding apparatus disclosed in FIG. 13. Specifically, for example, the predictor of the encoding apparatus of FIG. 13 may perform steps S1200 of FIG. 12; the residual processor of the encoding apparatus of FIG. 13 may perform S1210 to S1220 of FIG. 12; and the entropy encoder of the encoding apparatus of FIG. 13 may perform S1230 of FIG. 12. Also, although not shown, a process of generating a reconstructed picture and a reconstructed sample for the current block based on a predicted sample and a residual sample for the current block may be performed by an adder of the encoding apparatus.

Figure 14:
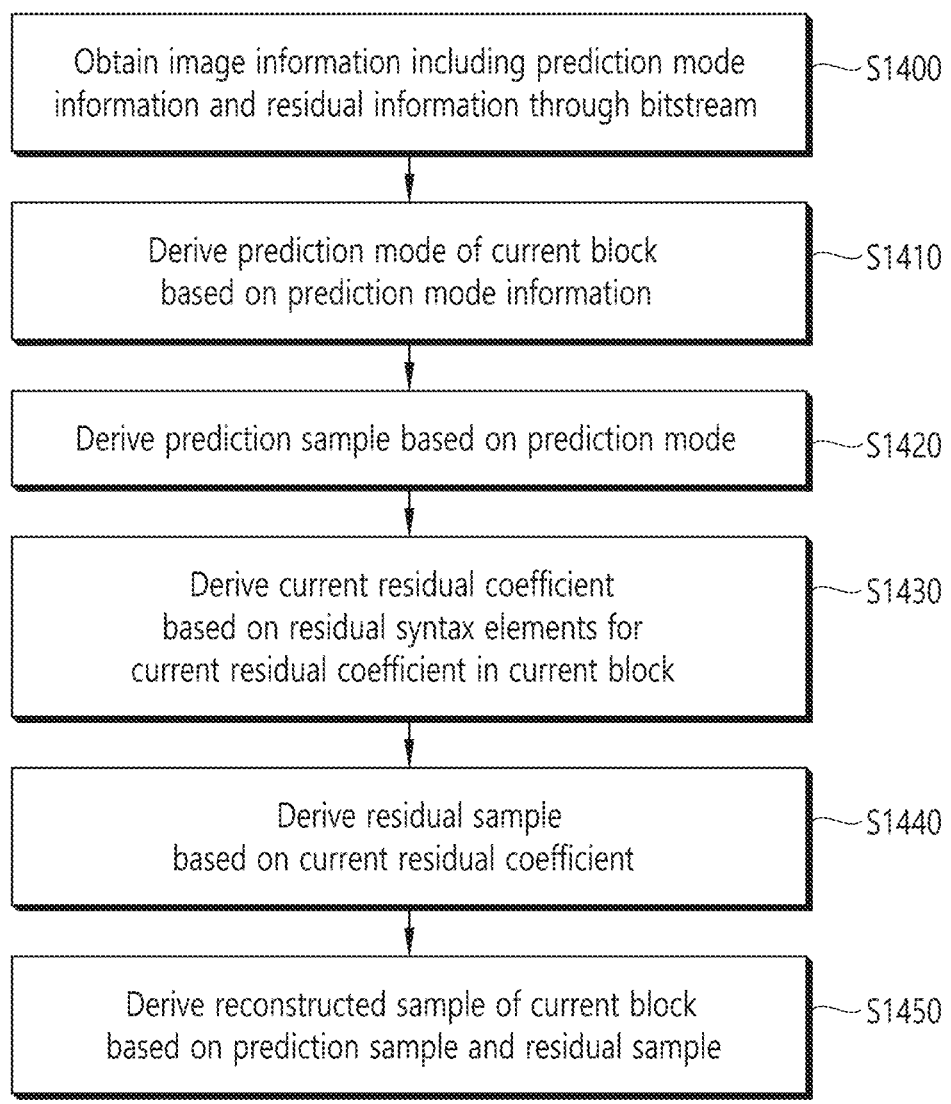
FIG. 14 briefly illustrates an image decoding method performed by a decoding apparatus according to the present disclosure.

FIG. 14 briefly illustrates an image decoding method performed by a decoding apparatus according to the present disclosure. The method disclosed in FIG. 14 may be performed by the decoding apparatus disclosed in FIG. 3. Specifically, for example, S1400 of FIG. 14 may be performed by the entropy decoder of the decoding apparatus; S1410 to S1420 may be performed by the predictor of the decoding apparatus; S1430 to S1440 may be performed by the residual processor of the decoding apparatus; and S1450 may be performed by an adder of the decoding apparatus.

The decoding apparatus obtains image information including prediction mode information and residual information through a bitstream (S1400). The decoding apparatus may obtain image information including prediction mode information and residual information for the current block through a bitstream. For example, the image information may include prediction mode information for the current block. For example, the image information may include prediction related information for the current block, and the prediction related information may include the prediction mode information. The prediction mode information may indicate whether inter prediction or intra prediction is applied to the current block.

Also, for example, the residual information may include residual syntax elements for a current residual coefficient in a current block. Also, for example, the residual information may include residual syntax elements for residual coefficients in the current block. Here, the current block may be a coding block (CB) or a transform block (TB). In addition, the residual coefficient may be referred to as a transform coefficient.

Also, for example, the current block may be a transform skip block.

Also, for example, a number of context-coded residual syntax elements for residual coefficients prior to the current residual coefficient among residual coefficients of the current block may be equal to a maximum number of context coded bins of the current block, residual syntax elements for the current residual coefficient may include absolute level information for the current residual coefficient and a sign flag of the current residual coefficient. The maximum number of context coded bins of the current block may be derived based on a width and a height of the current block. For example, the maximum context coded bins for the current block may be all used as bins of context-coded residual syntax elements for residual coefficients prior to the current residual coefficient among residual coefficients of the current block, residual syntax elements for the current residual coefficient may include coefficient level information for the current residual coefficient and a sign flag of the current residual coefficient. For example, when all of the maximum number of context coded bins for the current block are used for residual syntax elements for previous residual coefficients of the current residual coefficient in the scanning order, residual syntax elements for the current residual coefficient may include coefficient level information for the current residual coefficient and a sign flag of the current residual coefficient. The residual syntax elements for the current residual coefficient be decoded based on bypass. That is, the residual syntax elements for the current residual coefficient may be decoded based on a uniform probability distribution. For example, the coefficient level information may represent an absolute value of the coefficient level of the current residual coefficient. Also, the sign flag may represent a sign of the current residual coefficient. For example, when a value of the sign flag is 0, the sign flag may represent that the coefficient level of the current residual coefficient is a positive value, when the value of the sign flag is 1, the sign flag may represent that the coefficient level of the current residual coefficient is a negative value. The coefficient level information may be the abs_remainder, and the sign flag may be the coeff_sign_flag.

Also, for example, the residual information may include a transform skip flag for the current block. The transform skip flag may represent whether transform is applied to the current block. That is, the transform skip flag may represent whether transform is applied to the residual coefficients of the current block. The syntax element representing the transform skip flag may be the transform_skip_flag. For example, when a value of the transform skip flag is 0, the transform skip flag may represent that transform is not applied to the current block, when a value of the transform skip flag is 1, the transform skip flag may represent that transform is applied to the current block. For example, when the current block is a transform skip block, the value of the transform skip flag for the current block may be 1.

Also, for example, the image information may include the residual information for the current block. For example, the residual information may include residual syntax elements for a residual coefficient before the current residual coefficient in a scanning order. For example, the residual syntax elements may include syntax elements such as coded_sub_block_flag, sig_coeff_flag, coeff_sign_flag, abs_level_gt1_flag, par_level_flag, abs_level_gtX_flag, abs_remainder and/or coeff_sign_flag.

For example, the context-coded residual syntax elements may include a significant coefficient flag representing whether the residual coefficient is a non-zero residual coefficient, a parity level flag for a parity of the coefficient level for the residual coefficient, a sign flag representing a sign for the residual coefficient, a first coefficient level flag for whether the coefficient level is greater than a first threshold and/or a second coefficient level flag for whether the coefficient level is greater than a second threshold. Also, for example, the context-coded residual syntax elements may include a third coefficient level flag for whether the coefficient level is greater than a third threshold, a fourth coefficient level flag for whether the coefficient level of the residual coefficient is greater than a fourth threshold and/or a fifth coefficient level flag for whether the coefficient level of the residual coefficient is greater than a fifth threshold. Here, the significant coefficient flag may be sig_coeff_flag, the parity level flag may be par_level_flag, the sign flag may be coeff_sign_flag, the first coefficient level flag may be abs_level_gt1_flag, the second coefficient level flag may be abs_level_gt3_flag or abs_level_gtx_flag. Also, the third coefficient level flag may be abs_level_gt5_flag or abs_level_gtx_flag, the fourth coefficient level flag may be abs_level_gt7_flag or abs_level_gtx_flag, the fifth coefficient level flag may be abs_level_gt9_flag or abs_level_gtx_flag.

Also, for example, the residual information may include a bypass based coded syntax element for a residual coefficient of the current block. The bypass coded syntax element may include coefficient level information on a value of the current residual coefficient. The coefficient level information may be abs_remainder or dec_abs_level. Also, the bypass coded syntax element may include the sign flag.

The decoding apparatus derives a prediction mode of a current block based on the prediction mode information (S1410). The decoding apparatus may determine whether inter prediction or intra prediction is applied to the current block based on the prediction mode information, and may perform prediction based on this.

The decoding apparatus derives a prediction sample based on the prediction mode (S1420).

For example, the decoding apparatus may derive a prediction mode applied to the current block based on the prediction mode information, and may derive a prediction sample of the current block based on the prediction mode. For example, when inter prediction is applied to the current block, the decoding apparatus may derive motion information of the current block based on the prediction related information included in the image information, and may derive the prediction sample of the current block based on the motion information. Additionally, for example, when intra prediction is applied to the current block, the decoding apparatus may derive a reference sample based on neighboring samples of the current block, and may derive the prediction sample of the current block based on the reference sample and the intra prediction mode of the current block. The reference samples may include upper reference samples and left reference samples of the current block. For example, when a size of the current block is N×N, and an x component of a top-left sample position of the current block is 0, and a y component thereof is 0, then the left reference samples may be p[−1][0] to p[−1][2N−1], the top reference samples may be p[0][−1] to p[2N−1][−1].

The decoding apparatus derives a current residual coefficient based on residual syntax elements for the current residual coefficient in the current block (S1430). The decoding apparatus may derive the current residual coefficient based on the residual syntax elements. The residual syntax elements may include coefficient level information for the current residual coefficient and a sign flag of the residual coefficient.

For example, an absolute level of the current residual coefficient may be derived as a value indicated by coefficient level information for the current residual coefficient, and a sign of the current residual coefficient may be derived as a sign indicated by the sign flag.

Meanwhile, for example, the current residual coefficient may be derived without performing level mapping. For example, a number of context-coded residual syntax elements for residual coefficients prior to the current residual coefficient among residual coefficients of the current block may be equal to a maximum number of context coded bins of the current block, and the residual syntax elements for the current residual coefficient may include absolute level information for the current residual coefficient and a sign flag of the residual coefficient, and the current residual coefficient may be derived without performing level mapping. Here, deriving the current residual coefficient using only the absolute level information and the sign flag may be represented as simplified residual data coding. That is, the residual coefficients may be derived based on simplified residual data coding. Additionally, for example, context coded bins for the current block may be all used as bins of context-coded residual syntax elements for residual coefficients prior to the current residual coefficient among residual coefficients of the current block, and the residual syntax elements for the current residual coefficient may include coefficient level information for the current residual coefficient and a sign flag of the residual coefficient, and the current residual coefficient may be derived without performing level mapping. For example, when all of the maximum number of context coded bins for the current block are used for residual syntax elements for previous residual coefficients of the current residual coefficient in the scanning order, the residual syntax elements for the current residual coefficient may include coefficient level information for the current residual coefficient and a sign flag of the residual coefficient, and the current residual coefficient may be derived without performing level mapping. Also, for example, the residual coefficients prior to the current residual coefficient may be derived by performing the level mapping.

Meanwhile, for example, the level mapping may represent the method shown in Table 19 described above. For example, the level mapping may mean a process of deriving a minimum value among an absolute level of the left residual coefficient of a residual coefficient and an absolute level of the top residual coefficient of the residual coefficient, modifying an absolute level of the residual coefficient based on the minimum value by comparing the minimum value and the absolute level of the residual coefficient.

The decoding apparatus derives a residual sample based on the current residual coefficient (S1440). The decoding apparatus may derive the residual sample of the current block based on the current residual coefficient. That is, the decoding apparatus may derive the residual sample of the current block based on the current residual coefficient. For example, when it is derived that transform is not applied to the current block based on the transform skip flag, that is, when the value of the transform skip flag is one (1), the decoding apparatus may derive the current residual coefficient as the residual sample of the current block. Alternatively, for example, when it is derived that transform is not applied to the current block based on the transform skip flag, that is, when the value of the transform skip flag is 1, the decoding apparatus may derive the residual sample of the current block by dequantizing the current residual coefficient. Alternatively, for example, when it is derived that transform is applied to the current block based on the transform skip flag, that is, when the value of the transform skip flag is zero (0), the decoding apparatus may derive the residual sample of the current block by inverse transforming the current residual coefficient. Alternatively, for example, when it is derived that transform is applied to the current block based on the transform skip flag, that is, when the value of the transform skip flag is 0, the decoding apparatus may derive the residual sample of the current block by dequantizing the current residual coefficient and inverse transforming the dequantized coefficient.

The decoding apparatus derive a reconstructed sample of the current block based on the residual sample and the prediction sample (S1450).

For example, the decoding apparatus may derive a reconstructed sample of the current block based on the residual sample and the prediction sample. For example, the decoding apparatus may generate the reconstructed sample through addition of the prediction sample and the residual sample.

Thereafter, optionally, an in-loop filtering procedure such as deblocking filtering, SAO, and/or ALF procedures may be applied to the reconstructed picture as described above in order to improve subjective/objective picture quality.

Figure 15:
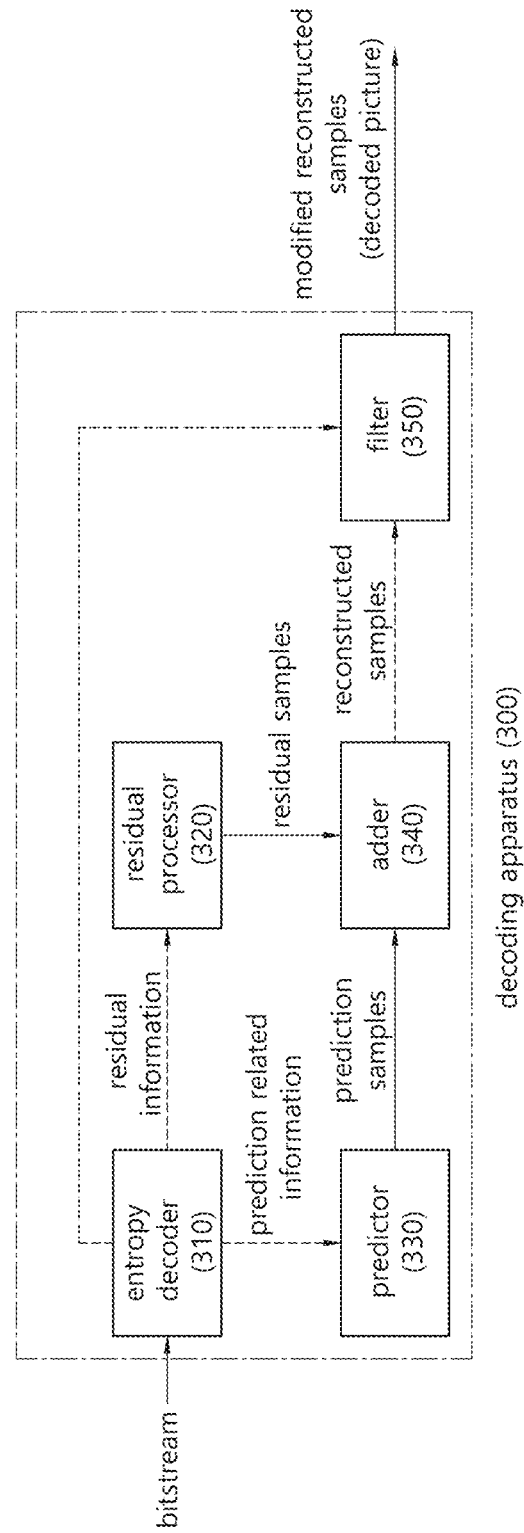
FIG. 15 briefly illustrates a decoding apparatus for performing an image decoding method according to the present disclosure.

FIG. 15 schematically represents a decoding apparatus for performing an image decoding method according to the document. The method disclosed in FIG. 14 may be performed by the decoding apparatus disclosed in FIG. 15. Specifically, for example, the entropy decoder of the decoding apparatus of FIG. 15 may perform S1400 of FIG. 14; the predictor of the decoding apparatus of FIG. 15 may perform S1410 to S1420 of FIG. 14; the residual processor of the decoding apparatus of FIG. 15 may perform S1430 to S1440 of FIG. 14; and the adder of the decoding apparatus of FIG. 15 may perform S1450 of FIG. 14.

According to the aforementioned present disclosure, efficiency of residual coding can be improved.

In addition, according to the present disclosure, it is possible to improve overall image/video compression efficiency and reduce the coding complexity by deriving the residual coefficients to which the simplified residual data coding is applied without performing level mapping.

In addition, according to the present disclosure, the residual coefficient to which the simplified residual data coding is applied may have a low correlation with the neighboring residual coefficients, and thus the efficiency of level mapping performed based on the neighboring residual coefficients may be low. Accordingly, it is possible to reduce coding complexity and improve overall residual coding efficiency without performing level mapping on the residual coefficients to which the simplified residual data coding is applied.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 16:
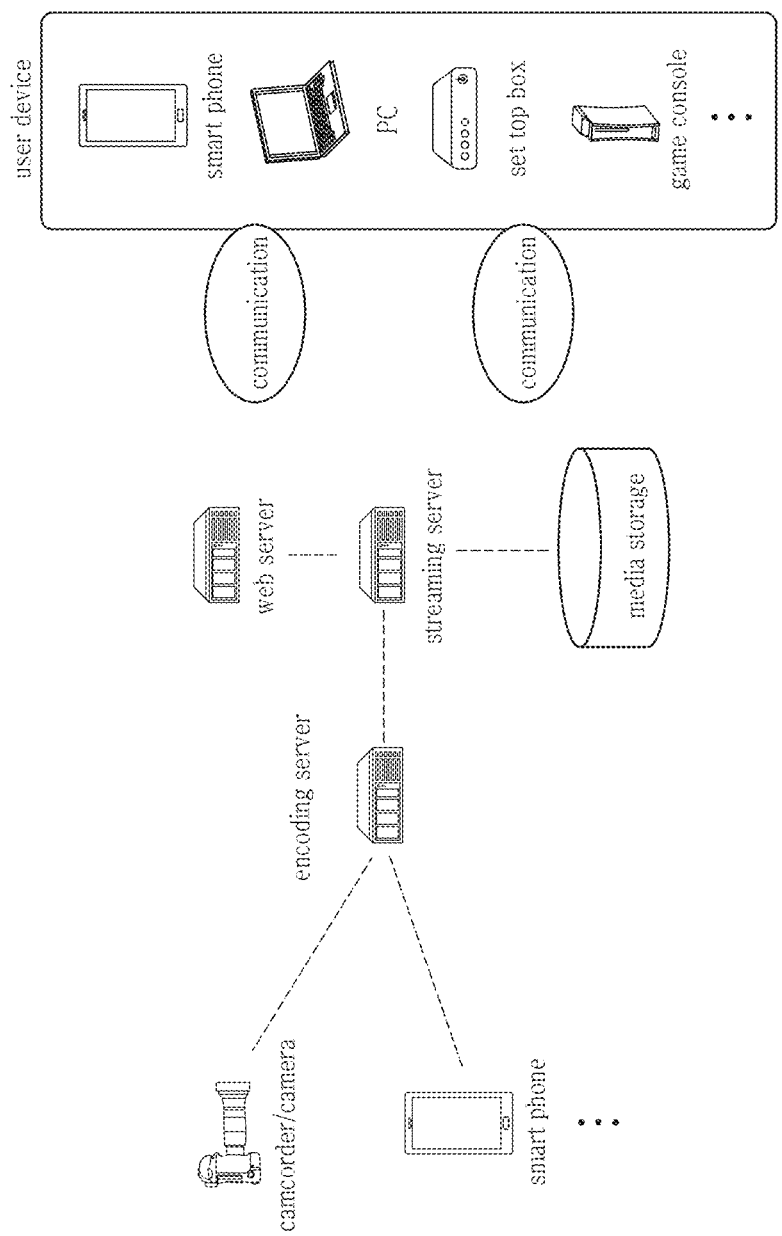
FIG. 16 illustrates a structural diagram of a contents streaming system to which the present disclosure is applied.

FIG. 16 illustrates a structural diagram of a contents streaming system to which the present disclosure is applied.

The content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

What is claimed is:

1. An image decoding apparatus, comprising:
a memory; and
at least one processor connected to the memory, the at least one processor configured to:
obtain image information including prediction mode information and residual information through a bitstream;
derive a prediction mode of a current block based on the prediction mode information;
derive a prediction sample based on the prediction mode;
derive a current residual coefficient based on residual syntax elements for the current residual coefficient in the current block;
derive a residual sample based on the current residual coefficient; and
derive a reconstructed sample of the current block based on the residual sample and the prediction sample,
wherein the residual information includes the residual syntax elements for the current residual coefficient,
wherein a number of context coded residual syntax elements for residual coefficients prior to the current residual coefficient among residual coefficients of the current block is equal to a maximum number of context coded bins of the current block,
wherein the residual syntax elements for the current residual coefficient include coefficient level information for the current residual coefficient and a sign flag of the current residual coefficient,
wherein an absolute level of the current residual coefficient is derived as a value indicated by the coefficient level information for the current residual coefficient, and a sign of the current residual coefficient is derived as a sign indicated by the sign flag,
wherein the current residual coefficient is derived without performing level mapping,
wherein the residual coefficients prior to the current residual coefficient are derived by performing the level mapping, and
wherein the level mapping for a target residual coefficient comprises
deriving a maximum value among an absolute level of a left residual coefficient of the target residual coefficient and an absolute level of a top residual coefficient of the target residual coefficient;
comparing an absolute level of the target residual coefficient with the maximum value; and
deriving a modified absolute level of the target residual coefficient based on the comparison.

2. The image decoding apparatus of claim 1, wherein the current block is a transform skip block.

3. The image decoding apparatus of claim 2, wherein the image information includes a transform skip flag representing whether transform is applied to the current block, and
wherein a value of the transform skip flag for the current block is 1.

4. The image decoding apparatus of claim 1, wherein the maximum number of the context coded bins of the current block is derived based on a width and a height of the current block.

5. The image decoding apparatus of claim 1, wherein the context coded bins for the current block are all used as bins of the context coded residual syntax elements for the residual coefficients prior to the current residual coefficient.

6. The image decoding apparatus of claim 1, wherein the context-coded residual syntax elements include a significant coefficient flag representing whether a residual coefficient is a non-zero residual coefficient, a parity level flag for a parity of a coefficient level for the residual coefficient, a sign flag representing a sign for the residual coefficient, a first coefficient level flag for whether the coefficient level is greater than a first threshold and a second coefficient level flag for whether the coefficient level is greater than a second threshold.

7. An image encoding apparatus, comprising:
a memory; and
at least one processor connected to the memory, the at least one processor configured to:
derive a prediction sample of a current block based on inter prediction or intra prediction;
derive a residual sample of the current block based on the prediction sample;
derive a current residual coefficient based on the residual sample; and
encode image information including prediction mode information representing a prediction mode of the current block and residual syntax elements for the current residual coefficient,
wherein a number of context coded residual syntax elements for residual coefficients prior to the current residual coefficient among residual coefficients of the current block is equal to a maximum number of context coded bins of the current block,
wherein the residual syntax elements for the current residual coefficient include coefficient level information for the current residual coefficient and a sign flag of the current residual coefficient,
wherein the coefficient level information represents an absolute value of a coefficient level of the current residual coefficient, and the sign flag of the current residual coefficient represents a sign of the current residual coefficient,
wherein the current residual coefficient is encoded without performing level mapping,
wherein the residual coefficients prior to the current residual coefficient are encoded by performing the level mapping, and
wherein the level mapping for a target residual coefficient comprises
deriving a maximum value among an absolute level of a left residual coefficient of the target residual coefficient and an absolute level of a top residual coefficient of the target residual coefficient;

comparing an absolute level of the target residual coefficient with the maximum value; and deriving a modified absolute level of the target residual coefficient based on the comparison.

8. The image encoding apparatus of claim 7, wherein the current block is a transform skip block.

9. The image encoding apparatus of claim 8, wherein the image information includes a transform skip flag representing whether transform is applied to the current block, and wherein a value of the transform skip flag for the current block is 1.

10. The image encoding apparatus of claim 7, wherein the maximum number of the context coded bins of the current block is derived based on a width and a height of the current block.

11. The image encoding apparatus of claim 7, wherein the context coded bins for the current block are all used as bins of the context coded residual syntax elements for the residual coefficients prior to the current residual coefficient.

12. The image encoding apparatus of claim 7, wherein the context-coded residual syntax elements include a significant coefficient flag representing whether a residual coefficient is a non-zero residual coefficient, a parity level flag for a parity of a coefficient level for the residual coefficient, a sign flag representing a sign for the residual coefficient, a first coefficient level flag for whether the coefficient level is greater than a first threshold and a second coefficient level flag for whether the coefficient level is greater than a second threshold.

13. A non-transitory computer-readable storage medium storing instructions that, when executed by at least one processor, perform an image encoding method for generating a bitstream, the image encoding method comprising:

deriving a prediction sample of a current block based on inter prediction or intra prediction;

deriving a residual sample of the current block based on the prediction sample;

deriving a current residual coefficient based on the residual sample;

encoding image information including prediction mode information representing a prediction mode of the current block and residual syntax elements for the current residual coefficient; and generating the bitstream including the image information, wherein a number of context coded residual syntax elements for residual coefficients prior to the current residual coefficient among residual coefficients of the current block is equal to a maximum number of context coded bins of the current block, wherein the residual syntax elements for the current residual coefficient include coefficient level information for the current residual coefficient and a sign flag of the current residual coefficient, wherein the coefficient level information represents an absolute value of a coefficient level of the current residual coefficient, and the sign flag of the current residual coefficient represents a sign of the current residual coefficient, wherein the current residual coefficient is encoded without performing level mapping, wherein the residual coefficients prior to the current residual coefficient are encoded by performing the level mapping, and wherein the level mapping for a target residual coefficient comprises:

deriving a maximum value among an absolute level of a left residual coefficient of the target residual coefficient and an absolute level of a top residual coefficient of the target residual coefficient;

comparing an absolute level of the target residual coefficient with the maximum value; and deriving a modified absolute level of the target residual coefficient based on the comparison.

14. An apparatus comprising:

a memory; and at least one processor connected to the memory, the at least one processor configured to:

obtain a bitstream of image information including prediction mode information representing a prediction mode of a current block and residual syntax elements for a current residual coefficient in the current block; and transmit data including the bitstream of the image information including the prediction mode information and the residual syntax elements, wherein a prediction sample of the current block is derived based on inter prediction or intra prediction, and the prediction mode information is information whether the inter prediction or the intra prediction is applied to the current block as the prediction mode of the current block, wherein the current residual coefficient is derived based on a residual sample of the current block and the residual sample is derived based on the prediction sample of the current block, wherein a number of context coded residual syntax elements for residual coefficients prior to the current residual coefficient among residual coefficients of the current block is equal to a maximum number of context coded bins of the current block, wherein the residual syntax elements for the current residual coefficient include coefficient level information for the current residual coefficient and a sign flag of the current residual coefficient, wherein the coefficient level information represents an absolute value of a coefficient level of the current residual coefficient, and the sign flag of the current residual coefficient represents a sign of the current residual coefficient, wherein the current residual coefficient is encoded without performing level mapping, wherein the residual coefficients prior to the current residual coefficient are encoded by performing the level mapping, and wherein the level mapping for a target residual coefficient comprises;

deriving a maximum value among an absolute level of a left residual coefficient of the target residual coefficient and an absolute level of a top residual coefficient of the target residual coefficient;

comparing an absolute level of the target residual coefficient with the maximum value; and deriving a modified absolute level of the target residual coefficient based on the comparison.

* * * * *